(12) United States Patent
Scalora et al.

(10) Patent No.: US 6,744,552 B2
(45) Date of Patent: Jun. 1, 2004

(54) PHOTONIC SIGNAL FREQUENCY UP AND DOWN-CONVERSION USING A PHOTONIC BAND GAP STRUCTURE

(76) Inventors: Michael Scalora, 15037 Ashmont Cir., Huntsville, AL (US) 35803; Mark J. Bloemer, 15829 Sanderson La., Athens, AL (US) 35613; Marco Centini, Via Fanfulla da Lodi 15, San Benedetto del Tronto (AP) (IT), 63039; Giuseppe D'Aguanno, Via Arigni 142, Cassino (FR) (IT), 03042

( * ) Notice: Subject to any disclaimer, the term of this patent is extended or adjusted under 35 U.S.C. 154(b) by 336 days.

(21) Appl. No.: 09/742,295

(22) Filed: Dec. 22, 2000

(65) Prior Publication Data

US 2001/0028029 A1 Oct. 11, 2001

(51) Int. Cl.⁷ .............................. G02F 2/02; G02F 1/39
(52) U.S. Cl. ........................................ 359/326; 359/330
(58) Field of Search .................................. 359/326–332

(56) References Cited

U.S. PATENT DOCUMENTS

| | | |
|---|---|---|
| 3,410,625 A | 10/1968 | Edwards |
| 3,853,386 A | 12/1974 | Ritter |
| 3,885,855 A | 5/1975 | Gross |
| 3,889,026 A | 6/1975 | Groth |
| 3,901,997 A | 8/1975 | Groth |
| 3,914,023 A | 10/1975 | Thelen |
| 3,978,273 A | 8/1976 | Groth |
| 4,179,181 A | 12/1979 | Chang |
| 4,189,205 A | 2/1980 | Vandehei |
| 4,229,066 A | 10/1980 | Rancourt et al. |
| 4,240,696 A | 12/1980 | Tracy et al. |
| 4,269,481 A | 5/1981 | Yeh et al. |
| 4,441,789 A | 4/1984 | Pohlack |
| 4,488,775 A | 12/1984 | Yamamoto |
| 4,525,687 A | 6/1985 | Chemla et al. |
| 4,556,277 A | 12/1985 | Fan et al. |
| 4,590,118 A | 5/1986 | Yatabe et al. |
| 4,726,655 A | 2/1988 | Mahlein |
| 4,756,602 A | 7/1988 | Southwell et al. |
| 4,770,496 A | 9/1988 | Mahlein |
| 4,773,717 A | 9/1988 | Pai et al. |
| 4,838,648 A | 6/1989 | Phillips et al. |
| 4,846,551 A | 7/1989 | Rancourt et al. |
| 4,915,494 A | 4/1990 | Shipley et al. |
| 5,035,485 A | 7/1991 | Kageyama |
| 5,071,206 A | 12/1991 | Hood et al. |
| 5,111,329 A | 5/1992 | Gajewski et al. |
| 5,119,232 A | 6/1992 | Daley et al. |
| 5,148,504 A | 9/1992 | Levi et al. |
| 5,170,290 A | 12/1992 | Land et al. |
| 5,179,468 A | 1/1993 | Gasloli |
| 5,187,461 A | 2/1993 | Brommer et al. |
| 5,212,584 A | 5/1993 | Chung |

(List continued on next page.)

OTHER PUBLICATIONS

Scalora et al, "Pulsed Second–Harmonic Generation In Nonlinear, One–Dimensional, Periodic Structures", Physical Review A, vol. 56, No. 4, Oct. 1997, pp. 3166–3174.*

(List continued on next page.)

*Primary Examiner*—John D. Lee
(74) *Attorney, Agent, or Firm*—James S. Finn

(57) ABSTRACT

A photonic band gap (PBG) device is provided for frequency up and/or down-converting first and second photonic signals incident on the device to produce a down-converted output photonic signal. When the first and second incident photonic signals have respective first and second frequencies $\omega_3$ and $\omega_2$, the down-converted photonic signal has a third frequency $\omega_1 = \omega_3 - \omega_2$. When the first incident field has a frequency $\omega_1$, the first up-converted photonic signal has a second frequency $\omega_2$. The second up-converted photonic signal has a third frequency $\omega_3 = \omega_1 + \omega_2$. Thus, the PBG device can be used to generate coherent near- and mid-IR signals by frequency down-converting photonic signals from readily available photonic signal sources, or red, blue, and ultraviolet signals by up-converting the same readily available photonic signal sources.

26 Claims, 14 Drawing Sheets

U.S. PATENT DOCUMENTS

| | | | |
|---|---|---|---|
| 5,225,930 A | 7/1993 | Land et al. | |
| 5,233,464 A | 8/1993 | Costich | |
| 5,239,406 A | 8/1993 | Lynam | |
| 5,247,528 A | 9/1993 | Shinozaki et al. | |
| 5,262,894 A | 11/1993 | Wheatley et al. | |
| 5,268,785 A | 12/1993 | Crenshaw et al. | |
| 5,302,449 A | 4/1994 | Eby et al. | |
| 5,315,430 A | 5/1994 | Brennan et al. | |
| 5,315,437 A | 5/1994 | Alfano et al. | |
| 5,337,183 A | 8/1994 | Rosenblatt | |
| 5,345,328 A | 9/1994 | Fritz et al. | |
| 5,355,245 A | 10/1994 | Lynam | |
| 5,372,874 A | 12/1994 | Dickey et al. | |
| 5,406,573 A | 4/1995 | Ozbay et al. | |
| 5,424,559 A | 6/1995 | Kasahara | |
| 5,433,988 A | 7/1995 | Fukuda et al. | |
| 5,440,421 A | 8/1995 | Fan et al. | |
| 5,448,404 A | 9/1995 | Schrenk et al. | |
| 5,457,570 A | 10/1995 | Lu et al. | |
| 5,471,180 A | 11/1995 | Brommer et al. | |
| 5,480,722 A | 1/1996 | Tomonaga et al. | |
| 5,493,442 A | 2/1996 | Buchholz et al. | |
| 5,506,037 A | 4/1996 | Termath | |
| 5,506,919 A | 4/1996 | Roberts | |
| 5,513,039 A | 4/1996 | Lu et al. | |
| 5,514,476 A | 5/1996 | Hartig et al. | |
| 5,552,882 A | 9/1996 | Lyons et al. | |
| 5,557,462 A | 9/1996 | Hartig et al. | |
| 5,559,825 A | 9/1996 | Scalora et al. | |
| 5,563,734 A | 10/1996 | Wolfe et al. | |
| 5,591,529 A | 1/1997 | Braatz et al. | |
| 5,595,825 A | 1/1997 | Guiselin | |
| 5,615,289 A | 3/1997 | Duck et al. | |
| 5,740,287 A | 4/1998 | Scalora et al. | |
| 5,751,466 A | 5/1998 | Dowling et al. | |
| 5,796,902 A | 8/1998 | Bhat et al. | |
| 5,801,378 A | 9/1998 | Hane et al. | |
| 5,907,427 A * | 5/1999 | Scalora et al. | 359/248 |
| 5,909,035 A | 6/1999 | Kim | |
| 5,999,308 A * | 12/1999 | Nelson et al. | 359/321 |
| 6,028,693 A | 2/2000 | Fork et al. | |
| 6,304,366 B1 * | 10/2001 | Scalora et al. | 359/328 |
| 6,388,799 B1 * | 5/2002 | Arnone et al. | 359/326 |
| 6,396,617 B1 * | 5/2002 | Scalora | 359/248 |
| 6,433,919 B1 * | 8/2002 | Chowdhury et al. | 359/332 |
| 2003/0039023 A1 * | 2/2003 | Romagnoli et al. | 359/326 |

OTHER PUBLICATIONS

Kiehne et al, "A Numerical Study Of Optical Second–Harmonic Generation In A One–Dimensional Photonic Structure", Applied Physics Letters, vol. 75, No. 12, Sep. 20, 1999, pp. 1676–1678.*

Centini et al, "Dispersive Properties Of Finite, One–Dimensional Photonic Band Gap Structures: Applications To Nonlinear Quadratic Interactions", Physical Review E vol. 60, No. 4, Oct. 1999, pp. 4891–4898.*

D'Aguanno et al, "Enhancement Of X(2) Cascading Processes In One–Dimensional Photonic Bandgap Structures", Optics Letters, vol. 24, No. 23, Dec. 01, 1999, pp. 1663–1665.*

Ball, G.A. and Morey, W.W. "Continuously tunable single–mode erbium fiber laser" Mar. 15, 1992, vol. 17, No. 6, pp. 420–422, *Optics Letters*.

Bendickson, J.M. "Analytic expresions for the electromagnetic mode density in fininte, one–dimensional, photonic band–gap structures" Apr. 1996, vol. 53, No. 4–B, pp. 4107–4121, *Physical Review E*.

Macleod, H.A. Thin Film Optical Filters. Macmillan Publishing Company, New York, Adam Hilger Ltd. Bristol, 2nd Edition.

Bloemer, M.J. and Scalora, M. "Transmissive properties of AG/MgF2 photonic band gaps" Apr. 16, 1998, vol. 72, No. 14, pp. 1676–1678, *Applied Physics Letters*.

Centini, M. "Dispersive properties of finite, one–dimensional photonic band gap structures: Applications to noninear quadratic interactions". Physical Review E, The American PHysical Society, Oct. 1999, vol. 60, No. 4–B, pp. 4891–4898.

D'Aguanna, G.D. et al. "Eusucement of X cascading processes in one–dimensional photonic bandgap structures" Dec. 1, 1999, vol. 24, No. 23, pp. 1663–1665, *Optics Letters*.

Fowles, Grant R., Introduction to Modern Optics, Second Edition, 1975, Holt, Rhinehart and Winston, pp. v–vii, 33–38, 52–55, 96–103.

Hans, J.W. "Enhanced second–harmonic generation in media with a weak periodicity" Physical Review A, THe American Physical Society, Mar. 1998, vol. 57, No. 3, pp. 2120–2128.

Marion, Jerry B., Classical Electromagnetic Radiation, 1965, Academic Press, Inc., pp. ix–xv, 148–152, 170–177.

Scalora, M. and Crenshaw, M.E. "A beam propagation method that handles reflections" Optics Communications, Elsevier Science B.V., Jun. 1, 1994, vol. 108, Nos. 4–6, pp. 191–196.

Scalora, M. "Dipole emission rate in one–dimensional photonic band–gap materials" Applied Physics B, Supplement, 1995, vol. B 60, Nos. 2–3, pp. S57–S61.

Scalora, M. "Optical limiting and Switching of Ultrashort Pulses in Nonlinear Photonic Band–Gap Materials" Physical Review Letters, The American Physical Society, Sep. 5, 1994, vol. 73, No. 10, pp. 1368–1371.

Scalora, M. "Pulse propagation near highly reflective surfaces: Application to photonic band–gap structures and the question of superluminal tunneling times"Jul. 1995, vol. 52, No. 1, pp. 726–734, *Physical Review A*.

Scalora, M. "Pulsed second–harmonic generation in nonlinear, one–dimensional, periodic structures" Physical Review A, The American Physical Society, Oct. 1997, vol. 56, No. 4, pp. 3166–3174.

Scalora, M. "Ultra–short pulse propagation at the photonic band edge: Large tunable group delay with minimal distertion and loss" Aug. 1996, Physical Review E, The American Physical Society, vol. 54, No. 2, pp. 1078–1081.

Tocci, M.D. "Thin–film nonlinear optical diode" May 1, 1995, Applied Physics Letters, American Institute of Physics, vol. 66, No. 18, pp. 2324–2326.

Ward, A.J. "Photonic dispersion surfaces" Mar. 6, 1995, Journal of Physics: Condensed Matter, IOP Publishing Ltd., vol. 7, No. 10, pp. 2217–2224.

Aklmediev, N. "Stability analysis of even and odd waves of symmetric nonlinear planar optical waveguides" Feb. 1993, J. Opt. Soc. Am. B, Optical Society of America, vol. 10, No. 2, pp. 230–236.

Brown, E.R. "Radiation properties of a planar antenna on a photonic–crystal substrate" Feb. 1993, J. Opt. Sec. Am. B, Optical Society of America, vol. 10, No. 2, pp. 404–407.

Bullock, D.L. "Photonic band structure investifation of two–dimensional Bragg reflector mirrors for semiconductor laser mode control" Feb. 1993, J. Opt. Soc. Am. B, Optical Society of America, vol. 10, No. 2, pp. 319–403.

Chernov, V.E. and Zon, B.A. "Depolarization of laser radiation in a nonlinear medium" Feb. 1993, J. Opt. Soc. Am. B, Optical Society of America, vol. 10, No. 2, pp. 210–212.

Chu, D.Y. and Ho, T. "Spontaneous emission from excitations in cyltrical dielectric waveguides and the spontaneous-emission factor of microgravity ring lasers" Feb. 1993, J. Opt. Soc. Am. B, Optical Society of America, vol. 10, No. 2, pp. 381–390.

De Martini, F. "Spontaneous and stimulated emission in the thesholdless microlaser" Feb. 1993, J. Opt. Soc. Am. B, Optical Society of America, vol. 10, No. 2, pp. 360–380.

Crook, R.J. "Long-range optical modes supported by a strong absorbing thin organic film" Feb. 1993, J. Opt. Soc. Am. B, Optical Society of America, vol. 10, No. 2, pp. 237–243.

Dowling, J.P. and Bowden, C.M. "Beat raditation from dipoles near a photonic band edge" Feb. 1993, J. Opt. Soc. Am. B, Optical Society of America, vol. 10, No. 2, pp. 353–355.

DeSalvo, R. et al. "Self-focusing and self-defocusing by cascaded second-order effects in KTP" Jan. 1, 1992, Optics Letters, Optical Society of America, vol. 17, No. 1, pp. 28–30.

Erdogan, T. "Enhancement and inhibition of radiation in cylindrically symmetric, periodic structures" Feb. 1993, J. Opt. Soc. Am. B, Optical Society of America, vol. 10, No. 2, pp. 391–398.

Gaylord, T.K. "Application of electromagnetics formalism to quantum-mechanical electron-wave propagation in semiconductors" Feb. 1993, J. Opt. Soc. Am. B., Optical Society of America, vol. 10, No. 2, pp. 333–339.

Genzack, A.Z. and Garcia, N. "Electromagentic localization and photonics" Feb. 1993, J. Opt. Soc. Am. B., Optical Society of American, vol. 10, No. 2, pp. 408–413.

Helmfrid, S. "Influence of various imperfections on the conversion efficiency of second-harmonic generation in quasi-phase-matching lithium niobate waveguides" Feb. 1993, J. Opt. Sec. Am. B., Optical Society of America, vol. 10, No. 2, pp. 222–229.

Kilin, S. Ya. and Fedchenia, L.I. "Statistics of random spikes in the intensity of stimulated Raman scattering: Initiation by spatially distributed fluctuations" Feb. 1993, J. Opt. Soc. Am. B., Optical Society of America, vol. 10, No. 2, pp. 199–209.

Kurizki, G. "Quantum electrodynamics in photonic band gaps: Atomic-beam interaction with a defect mode" Feb. 1993, J. Opt. Soc. Am. B., Optical Society of America, vol. 10, No. 2, pp. 346–352.

Leonski, W. "Squeezed-state effect on bound-continuum transitions" Feb. 1993, J. Opt. Soc. Am. B., Optical Society of America, vol. 10, No. 2, pp. 244–252.

Leung, K.M. "Defense modes in photonic band structures: A Green's function approach using vector Wanuler functions" Feb. 1993, J. Opt. Soc. Am. B., Optical Society of American, vol. 10, No. 2, pp. 303–306.

Maradudin, A.A. and McGurn, A.R. "Photonic band structure of a truncated two-dimensional, periodic dielectric medium" Feb. 1993, J. Opt. Soc. Am. B., Optical Society of America, vol. 10, No. 2, pp. 307–313.

Meade, R.D. "Nature of th ephotonic band gap: Some insight from a field analysis" Feb. 1993, J. Opt. Soc. Am. B., Optical Society of America, No. 10, No. 2, pp. 328–332.

Montemezzani, G. "Photo refractive charge conpensation at elecated temperatures and applicaiton to KnbO3" Feb. 1993, J. Opt. Sec. Am. B., Optical Society of America, vol. 10, No. 2, pp. 171–185.

Mossberg, T.W. and Lewenstein, M. "Radiative properties of strongly driven atoms in the presence of photonic bands and gaps" Feb. 1993, J. Opt. Soc. Am. B., Optical Society of America, vol. 10, No. 2, pp. 340–345.

Robertson, W.M. "Measurement of the photon dispersion relation in two-dimensional ordered dielectric arrays" J. Opt. Soc. Am. B, Optical Society of America, Feb. 1993, vol. 10, No. 2, pp. 322–327.

Smith, D.R. "Photonic band structure and defects in one and two dimensions" J. Opt. Soc. Am. B, Optical Society of America, Feb. 1993, vol. 10, No. 2, pp. 314–321.

Sozuer, H. and Haut, J.W. "Photonic bands: simple-cubic lattice" J. Opt. Soc. Am. B, Optical Society of America, Feb. 1993, vol. 10, No. 2, pp. 296–302.

Sugawara, T. "Instability in a CO2 sequence-band laser with a saturable absorber and vibration energy transfer process" J. Opt. Soc. Am. B, Optical Society of America, Feb. 1993, vol. 10, No. 2, pp. 265–270.

Tong, B.Y. "Florescence-lifetime measurements in a monodispersed suspension of polystyrene particles" J. Opt. Soc. Am. B, Optical Society of America, Feb. 1993, vol. 10, No. 2, pp. 356–359.

Wiihekoon, W.M.K.P. "Second-harmonic generation studies of differences in molecular orientation of Lanfmuir-Biodgett films fabricated by vertical and horizonal dipping techniques" J. Opt. Soc. Am. B, Optical Society of America, Feb. 1993, vol. 10, No. 2, pp. 213–221.

Yablanovich, E. "Photonic band-gap structures" J. Opt. Soc. Am. B, Optical Society of America, Feb. 1993, vol. 10, No. 2, pp. 283–295.

Zahavi, O. "Study of amplified spontaneous emissions systems by the ray-tracing technique" J. Opt. Soc. Am. B, Optical Society of America, Feb. 1993, vol. 10, No. 2, pp. 271–278.

Ziolkowski, R.W. and Jodkins, J.B. "Full-wave vector Maxwell equation modeling of the self-focusing of ultrashort optical pulses in a nonlinear Kerr medium exhibiting a finite response time" J. Opt. Soc. Am. B, Optical Society of America, Feb. 1993, vol. 10, No. 2, pp. 186–198.

* cited by examiner

PHOTONIC SIGNAL FREQUENCY UP AND DOWN-CONVERSION USING A PHOTONIC BAND GAP STRUCTURE

CROSS-REFERENCE TO RELATED APPLICATION

This application is related to International Application PCT/US98/06378, with an international filing date of Apr. 2, 1998, now pending (incorporated by reference herein in its entirety).

STATEMENT AS TO RIGHTS TO INVENTIONS MADE UNDER FEDERALLY-SPONSORED RESEARCH AND DEVELOPMENT

This invention was made with Government support under Contract DAAH01-96-P-R010 awarded by the U.S. Army Missile Command. The Government has certain rights in the invention.

BACKGROUND OF THE INVENTION

1. Field of the Invention

This invention relates to the generation of photonic signals at frequencies other than the input signal. In particular, it relates to photonic signal frequency up and down-conversion.

2. Related Art

In recent years, advances in photonic technology have generated a trend toward the integration of electronic and photonic devices. These devices offer an array of advantages over conventional electronic devices. For example, they can provide enhanced speed of operation, reduced size, robustness to environmental changes, such as rapid temperature variations, and increased lifetime and ability to handle high repetition rates. These structures can be made of metals, semiconductor materials, ordinary dielectrics, or any combination of these materials.

The intense theoretical and experimental investigations of photonic band gap (PBG) structures that have occurred during the last few years are evidence of the widely recognized potential that these new materials offer. In such materials, electromagnetic field propagation is forbidden for a range of frequencies, and allowed for others. The nearly complete absence of some frequencies in the transmitted spectrum is referred to as a photonic band gap (PBG), in analogy to semiconductor band gaps. This phenomenon is based on the interference of light; for frequencies inside the band gap, forward- and backward-propagating components can cancel destructively inside the structure, leading to complete reflection.

For example, recent advancements in PBG structures have been made in the development of a photonic band edge nonlinear optical limiter and switch. See, "Optical Limiting and Switching of Ultrashort Pulses in Nonlinear Photonic Band-Gap Materials", M. Scalora, et al., *Physical Review Letters* 73:1368 (1994) (incorporated by reference herein in its entirety). Also, advancements in photonic technology have been achieved with the development of the nonlinear optical diode. See, "The Photonic Band-Edge Optical Diode", M. Scalora, et al., *Journal of Applied Physics* 76:2023 (1994), which is incorporated by reference herein in its entirety. In addition, the physical processes involved in the photonic signal delay imparted by a uniform PBG structure are described in detail in Scalora, et al., "Ultrashort pulse propagation at the photonic band edge: large tunable group delay with minimal distortion and loss," Phys. Rev. E Rapid Comm. 54(2), R1078–R1081 (August 1996), which is incorporated by reference herein in its entirety.

The frequency conversion of coherent light sources, such as lasers, has been investigated for many years, because of the desirability to expand the ranges of available output wavelengths. Many different processes have been utilized, including Raman-shifting, harmonic generation, and quasi-phase-matching techniques. Also important are frequency up-and down-conversion, and the more general issue of obtaining laser radiation at frequencies generally not accessible with a more direct process.

Harmonic generation involves the non-linear interactions between light and matter using a suitable non-linear material that can generate harmonics at multiples of the pump signal frequency. Conventional non-linear materials include potassium di-hydrogen phosphate (KDP), β-barium borate (BBO), lithium triborate (LBO), lithium niobate ($LiNbO_3$), and the like. However, the utility of these types of non-linear crystals for efficient frequency conversion often depends on proper adjustment of parameters such as non-linear coefficients, phase-matching capabilities, walk-off angle, and angular acceptance.

For example, lithium niobate is conventionally used for second harmonic (SH) generation because its nonlinear $\chi^{(2)}$ coefficient is larger than most other materials. In addition, the effective magnitude of $\chi^{(2)}$ can be enhanced further by a process called polling. Typically, a certain length of $LiNbO_3$ material, ordinarily a few millimeters to a few centimeters, is subdivided in sections each on the order of a few microns in thickness. Then, a strong, static electric field is applied to the material such that the direction of the electric field is reversed in each successive, adjacent section. In effect then, the field leaves a permanent impression behind, similar to the impression that visible light leaves on a photographic plate, which causes the sign of the $\chi^{(2)}$ to reverse in a predetermined way in each successive section throughout the length of the material. As a consequence of alternating the sign of the nonlinear index of refraction, a technique that is also referred to as quasi-phase-matching (QPM), SH generation from a similar length of material that is not quasi-phase-matched can be orders of magnitude smaller than the phase-matched case.

The reason for this kind of material processing can be explained as follows. For SH generation, a field at twice the original frequency, is generated. In addition to its dependence on field strength, the index of refraction of any material also depends on frequency. For typical SH up-conversion, the indices of refraction may differ by as much as 10% or more; this means that the speed of light in the material may differ by that amount, causing the two waves, the fundamental and the SH, to get out of phase. As it turns out, by modulating the $\chi^{(2)}$, the waves tend to remain in phase, which defines the QPM phenomenon, thus yielding enhanced SH generation. The fact that the $\chi^{(2)}$ changes sign does not mean that there is a material discontinuity, i.e., the sign reversal occurs in the same material. The sign reversal of the nonlinear coefficient merely implies that a molecular realignment is induced by treating the material in a way to cause QPM phenomenon.

QPM devices utilized in frequency conversion are typically on the order of a few millimeters, perhaps 1–2 centimeters (cm) in length or more. What is needed is a device that performs frequency conversion of a light source that is compact in size, has sufficient conversion efficiency, and can be manufactured by conventional techniques.

There are many optical wavebands (that is, optical frequency bands or ranges) with good propagation characteristics from which to choose for imaging laser radars. These bands include the near-Infra Red (IR) (1.06–3.0 micrometers ($\mu$m)), the mid-IR (3.0–5.0 $\mu$m), and the far-IR (9–11 $\mu$m). The near- and mid-IR wavebands hold potential for many applications, including long distance laser ranging and tracking, and detection of environmental pollutants, such as $NO_2$ compounds, for example. Although the near- and mid-IR wavebands exhibit good propagation characteristics, there is a lack of efficient, compact optical sources in these spectral regions.

Therefore there is a need for an efficient and compact source of optical radiation in the near- and mid-IR wavebands.

SUMMARY OF THE INVENTION

The present invention provides a photonic band gap (PBG) device that frequency down-converts first and second photonic signals incident on the device to produce a down-converted output photonic signal. Alternatively, in the case of frequency up-conversion, one or more photonic signals may be combined to produce an photonic signal with a higher frequency. According to the present invention, in the case of frequency down-conversion, when the first and second incident photonic signals have respective first and second frequencies $\omega_3$ and $\omega_2$, the down-converted photonic signal has a third frequency $\omega_1 = \omega_3 - \omega_2$. We note that there is no restriction on the actual values of $\omega_1$, $\omega_2$, and $\omega_3$, and that two photonic signals might be combined to generate a microwave signal, for example. In addition, there is no restriction on the number of waves that are combined to generate one or more down-converted signals. The same arguments hold in the case of up-conversion. One or more photonic signal of frequencies $\omega_1$, $\omega_2$, and $\omega_3$ may be combined inside an appropriately designed PBG device in order to generate a set of higher frequencies. Thus, the PBG device of the present invention can advantageously be used to generate coherent signals from the near- to mid-IR and microwave ranges, which includes Terahertz photonic signals, by frequency down-converting photonic signals from readily available photonic signal sources. By the same token, the PBG device of the present invention can advantageously be used to generate coherent signals from the near-IR to the green, blue, ultraviolet, and beyond, by frequency up-converting photonic signals from readily available photonic signal sources. In other words, photonic signals readily available by other means, such as lasing, can be used to conveniently obtain light at lower or higher frequencies (that is, "mixed-up or -down"), such as the near-IR, mid-IR, and microwave range on one end of the spectrum, and the ultraviolet and beyond on the other end of the spectrum, according to present invention.

The PBG device for nonlinear frequency conversion, which includes up and down-conversion, includes a plurality of first material layers and a plurality of second material layers. In general, the first and second material layers receive first and second photonic signals incident upon the device. The first and second frequencies have respective first and second frequencies. The first and second material layers are arranged such that the PBG device has a photonic band gap structure exhibiting first and second transmission band edges respectively corresponding to the first and second frequencies. An interaction of the first and second photonic signals with the arrangement of layers causes the frequency mixing process to generate a third photonic signal having a third frequency that is less than the first and second frequencies in a commensurate manner. The generated third frequency may be the sum and/or the difference between the first and second frequency, and corresponds to a third PBG resonance in the PBG device. If this correspondence of the generated frequency with another band edge resonance is found, then the generation process can be orders of magnitude more efficient compared to QPM systems, which represent the current state of the art.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview of the Present Invention

Figure 1A:
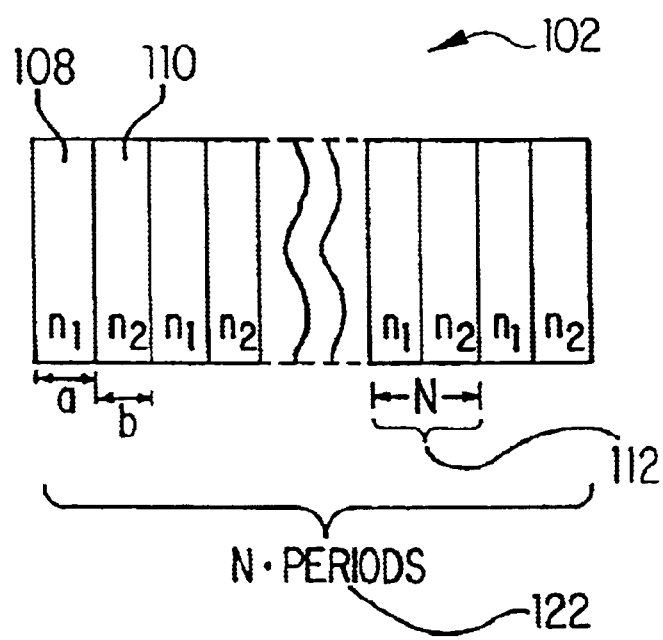
FIG. 1A is a schematic representation of one embodiment of the present invention, a quarter-wave frequency conversion device with a uniform PBG structure.

The present invention provides a frequency conversion device that utilizes a photonic band gap (PBG) structure. The enhancement mechanism demonstrated in these PBG structures in the linear regime leads to frequency up-(or down-) conversion rates nearly three orders of magnitude better than conversion rates achieved with ordinary phase matched materials, or in conventional fiber grating geometry. The geometrical properties and the periodicity of the PBG structure can act to significantly modify the density of electromagnetic field modes and phase matching conditions near the band edge, thus facilitating the emission of the second harmonic (SH) signal at a much-enhanced rate. More importantly perhaps, this means that current fabrication issues that arise in ordinary quasi-phase-matched structures can be avoided altogether by utilizing current technology for deposition of semiconductor or dielectric thin films and combinations thereof.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

2. Nonlinear Interaction of Light with Matter

The nonlinear interaction of light with matter is important for applications in the field of light generation at frequencies that are usually not accessible by a more direct laser process. At a qualitative level, all materials found in nature are nonlinear to some degree. This means that the characteristic properties of ordinary materials, such as the dielectric susceptibility, change if an applied electromagnetic field intensity is strong enough.

This dependence of the susceptibility (which ultimately is a statement of the index of refraction of the material) on the electric field strength can be exemplified in the following way:

$$\chi = \chi^{(1)} + \chi^{(2)}E + \chi^{(3)}E^2 + \ldots \chi^{(j)}E^{j-1} \ldots + \ldots$$

where j is an integer, $\chi^{(1)}$ is the medium susceptibility for low incident fields, $\chi^{(j)}$ is the jth nonlinear coefficient whose magnitude decreases rapidly as (j) increases, and E is the applied field. Therefore, contributions from the jth term become significant if the field strength is gradually increased. Typically, the $\chi^{(j)}$ can be two to four orders of magnitude greater than each successive $\chi^{(j+1)}$ coefficient, depending on the material. On the other hand, all the coefficients with odd or even (j) greater than one may vanish, depending on the characteristics of the material, such as symmetry properties, at the molecular level. For example, all the even coefficients vanish if the molecule has a geometrical center of symmetry, as in a gas.

Because of the nonlinear contributions to the dielectric susceptibility, the application of a strong external optical field at frequency $\omega$, for example, is capable of generating light at frequency $2\omega$, $3\omega$, $4\omega$, and so on. By the same token, if two strong fields of different frequencies $\omega_1$ and $\omega_2$ are applied to the nonlinear material, light at frequencies ($\omega_1 + \omega_2$) and ($\omega_1 - \omega_2$) (i.e., sum and difference frequencies) can also be generated in addition to the individual harmonics. For example, a $\chi^{(2)}$ medium, which means that the first order nonlinear coefficient dominates the dynamics, is capable of SH generation, and sum and difference frequency conversion; a $\chi^{(3)}$ medium is capable of third harmonic generation, and so on.

For example, a type of nonlinear frequency conversion that is typically sought in nonlinear media is SH generation. However, the present description is also applicable for nonlinear frequency conversion to higher or lower frequencies, such as third harmonic generation, and so on.

Conventional nonlinear materials used for frequency conversion processes, such as $LiNbO_3$, are processed in such a way that the nonlinear contribution to the index of refraction alternates sign every few tens of microns. However, the linear index of refraction of the $LiNbO_3$ host material is not modified in any way (i.e., it is spatially uniform).

The method of forming a device designed to perform frequency conversion, according to the present invention, is completely different: a spatial modulation is imparted to the linear part of the refractive index. In other words, the linear index of refraction of the structure alternates between a high and a low value, which can happen only if the materials are different. This is accomplished by alternating at least two materials, such as GaAs (Gallium Arsenide) and AlAs (Aluminum Arsenide), whose indices of refraction are approximately 3.4 and 2.9 respectively, resulting in a structure between 5 and a few tens of microns in length. The consequence of alternating different materials with different refractive indices as indicated above is the creation of a photonic band gap (PBG) structure.

The physical processes that are exploited in the present invention are different from conventional frequency conversion techniques in that photonic band edge effects are utilized. Photonic band edge effects cause strong overlap of the pump and SH signals, significant reduction of the respective propagation velocities, and therefore, increased interaction times, and exact phase matching conditions which do not ordinarily exist in nature. As described below, some of the advantages of the present invention include: (1) the structure can be 100 to 1000 time shorter than typical QPM structures, with comparable conversion efficiencies; (2) ordinary semiconductor materials can be used in forming the PBG structure, leading to a reduction of production costs; and (3) the PBG device is compatible with integrated circuit environments due to its size and composition.

3. Frequency Conversion Using a PBG Structure

In one dimension, a photonic band gap structure comprises a plurality of layers, as shown in FIG. 1A, where the plurality of layers alternates between a low and a high index of refraction. PBG structure 102 comprises a stack of alternating layers 108 and 110 of refractive materials having predetermined indices of refraction $n_1$ and $n_2$ (for low incident pump powers), and predetermined thicknesses a and b, respectively. In particular, the first type of layer 108 can be chosen such that it is a high index layer $n_1$. The second type of layer 110 can be chosen to be a low index layer $n_2$. The widths of the layers can be chosen such that they are both a fraction of the size of the incident pump wavelength. We note that it is possible to combine more than two types of layers to form a photonic band gap structure in a known manner. For example, a third type of layer of index $n_3$ can be added to the stack while the pass bands and band gaps still remain visible. For simplicity, however, all the example that we will show consist of only two types of layers.

For example, first layer 108 can be designed to have a thickness (a) corresponding to the wavelength of an incoming photonic signal ($\lambda$), determined by the equation $a=\lambda/4n_1$. Similarly, second layer 110 can have an index of refraction $n_2$, and a thickness (b), where $b=\lambda/4n_2$. This pattern can be repeated for N periods 122, where a period is equal to one set of alternating layers 112. This type of structure is also referred to as a quarter-wave structure. As would be apparent to one of ordinary skill in the art based on the present description, other arrangements of alternating layers can also be made, depending on the particular frequency conversion application, and structures that are not necessarily periodic are also envisioned. This means that the thicknesses of one or several layers inside the stack are not necessarily equal or commensurate with the other layers inside the stack. For example, one layer or more layers might be chosen to be ½, ¾, or any other fraction which might be helpful in the design process. Adjusting layer width causes a shift of the location of the band gap to a different frequency. This property is a beneficial and useful one, which as we will see below is the key to the flexibility and functionality of the device when the options of input and output laser frequencies are being considered.

Figure 1B:
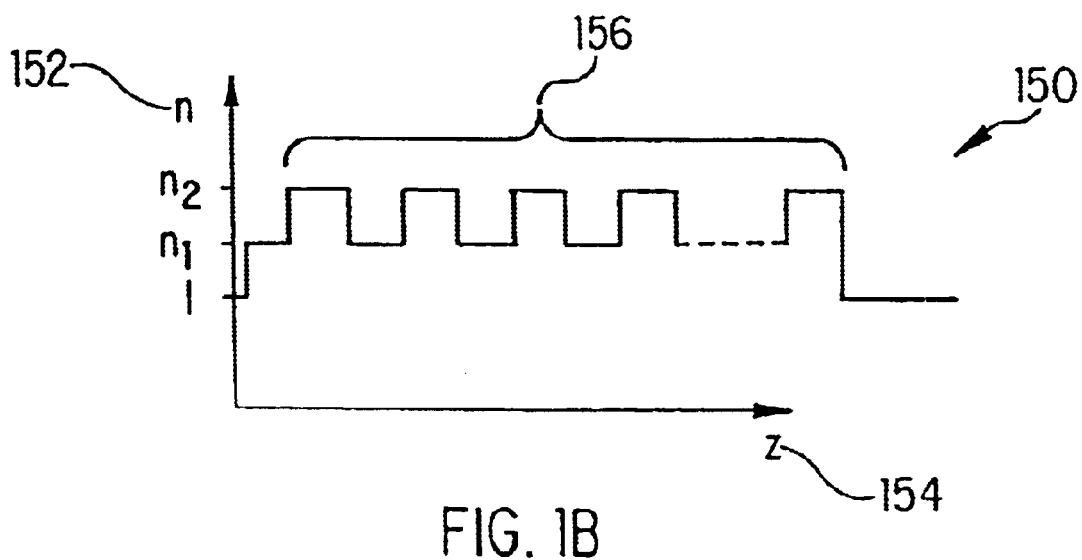
FIG. 1B is a diagram of the characteristic index of refraction profile of the uniform PBG structure shown in FIG. 1A.

FIG. 1B is a diagram of a characteristic index of refraction square-wave pattern profile of PBG structure 102 for N periods. Diagram 150 plots the index of refraction (n) 152 of a uniform PBG structure as a function of distance (z) 154, which is limited by the number of periods 156 in the device. Diagram 150 illustrates the periodic nature of the abrupt refractive index changes occurring in the material.

In general, large index modulation PBG structures (that is, the index difference between adjacent layers can be of order unity) are not susceptible to nonlinear index changes because index variations are a small perturbation on the linear index modulation depth. As described below, for ultrashort pulses tuned near the photonic band edge, a choice of materials with suitable indices of refraction, thicknesses, and periodicity can lead to low group velocities, enhanced field intensity, exact phase matching conditions, and conversion efficiencies nearly three orders of magnitude larger than conventional QPM, bulk up-conversion rates. Conversion efficiencies greater than $10^{-3}$ (that is, at least one part in a thousand of the original beam's energy is converted to the second frequency) can be achieved for structures only a few micrometers in length, with a single pump pass, and at realistic pump intensities. Plane-wave conversion rates can be approximated by utilizing pulses whose frequency bandwidth is smaller than the transmission resonance bandwidth, such as for pump signals only a few picoseconds (ps) in duration.

Figure 2:
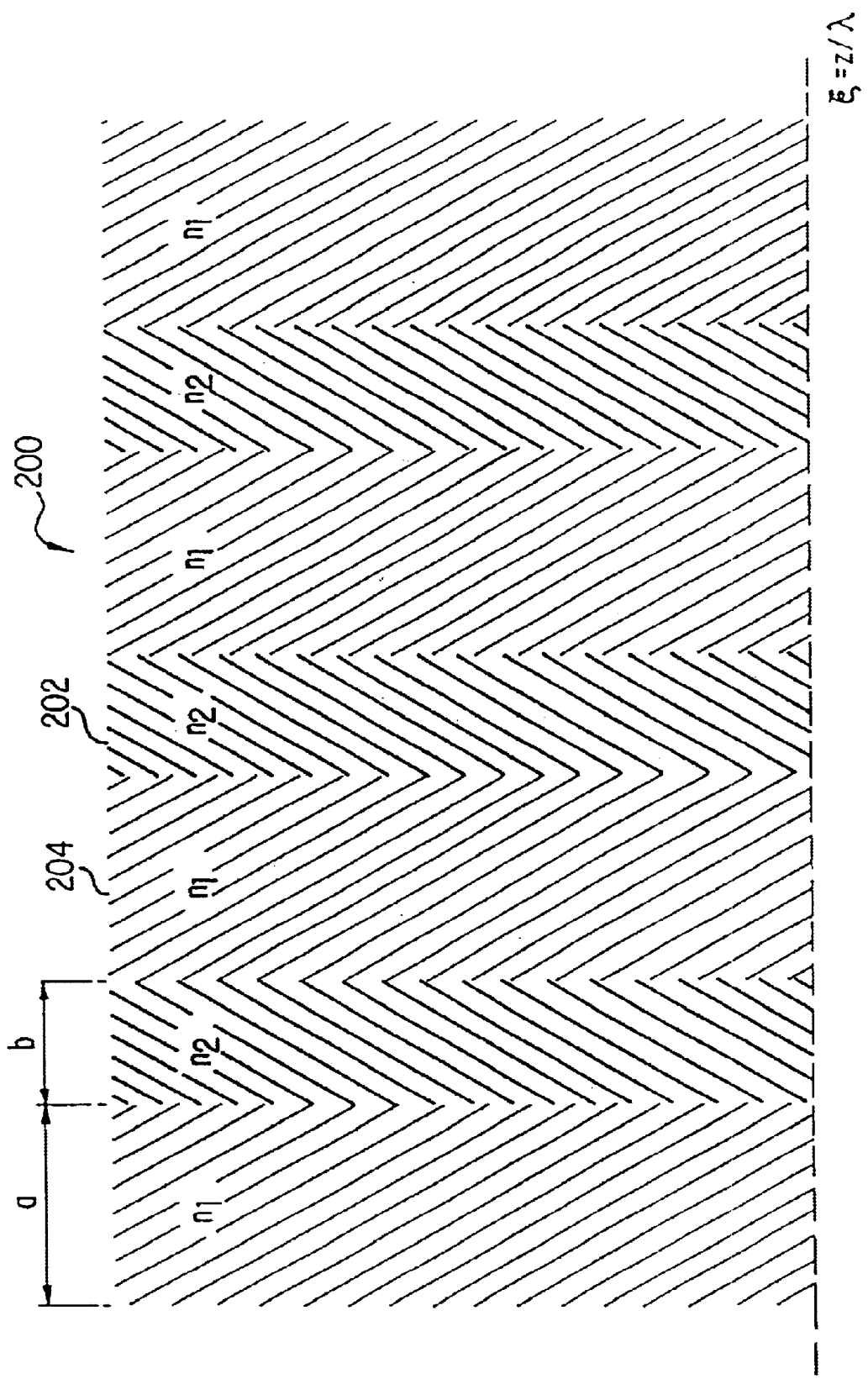
FIG. 2 is a schematic diagram of one embodiment of the present invention, a mixed quarter-half-wave PBG device.
Figure 4:
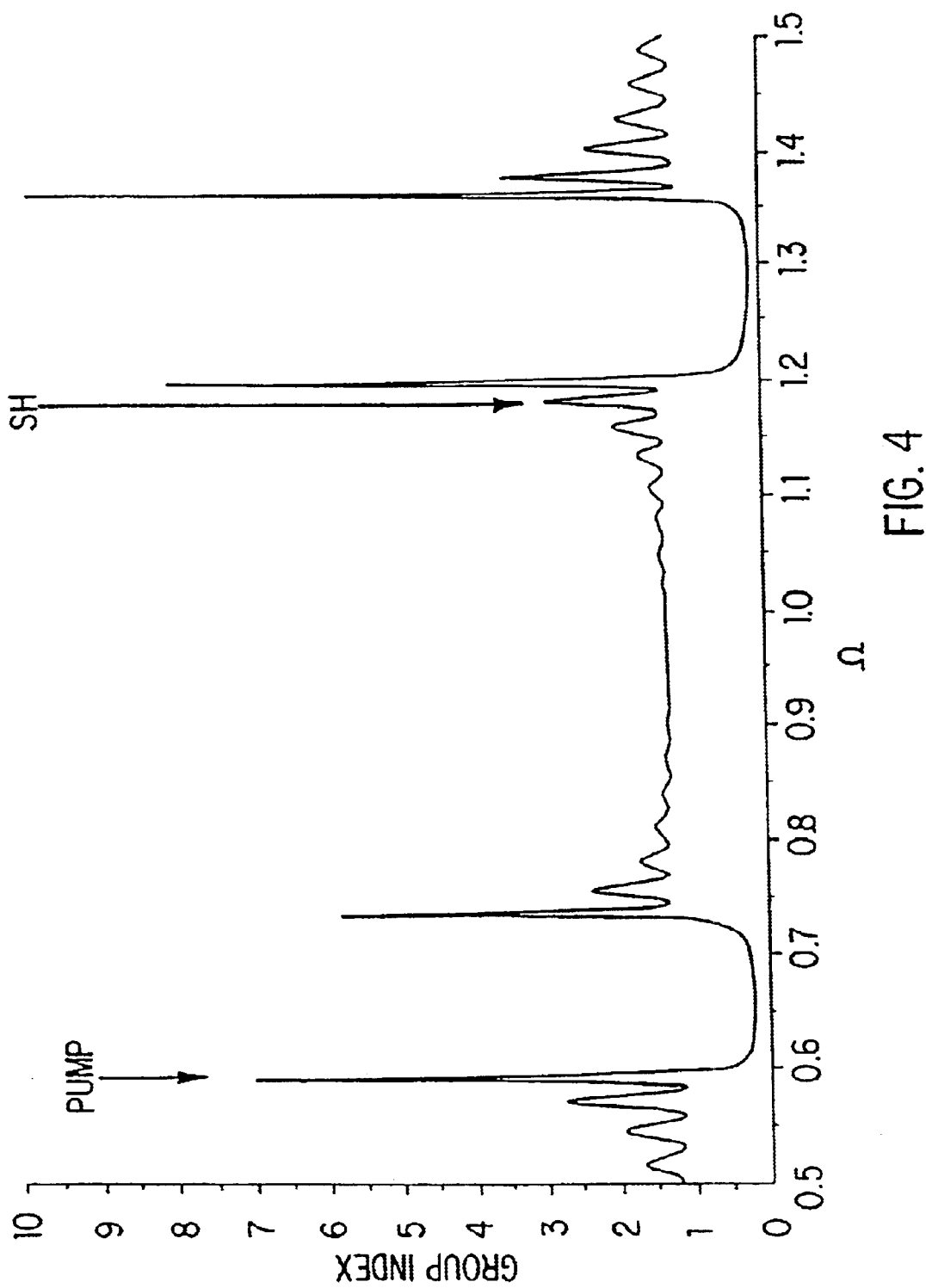
FIG. 4 shows group index versus normalized, dimensionless frequency profile according to the present invention.

A preferred embodiment of the present invention is shown in FIG. 2. PBG structure 200 is formed in such a way that a single period comprises two basic layers: a quarter-wave layer 202 and a half-wave layer 204, to form a periodic, mixed quarter-half-wave structure. This particular choice causes the first and second order band edges to be approximately a factor of two apart from each other, as indicated in FIG. 4, described in detail below. Then, both the pump and SH fields are tuned to their respective photonic band edges. This coincidence of the band edges leads to strong overlap of the fields, significant reduction of the wave velocities by several orders of magnitude below the speed of light in either medium, increased interaction times, and exact phase matching. See, e.g., "Pulsed second harmonic generation in one-dimensional, periodic structures", Phys. Rev. A, October 1997, by Scalora et al., and "Dispersive properties of finite, one-dimensional photonic band gap structures: applications to nonlinear quadratic interactions", Phys. Rev. E. October 1999, (both incorporated by reference herein in its entirety). These factors result in an increase in the SH energy output that significantly exceeds conventional QPM, current state of the art devices.

Figure 3:
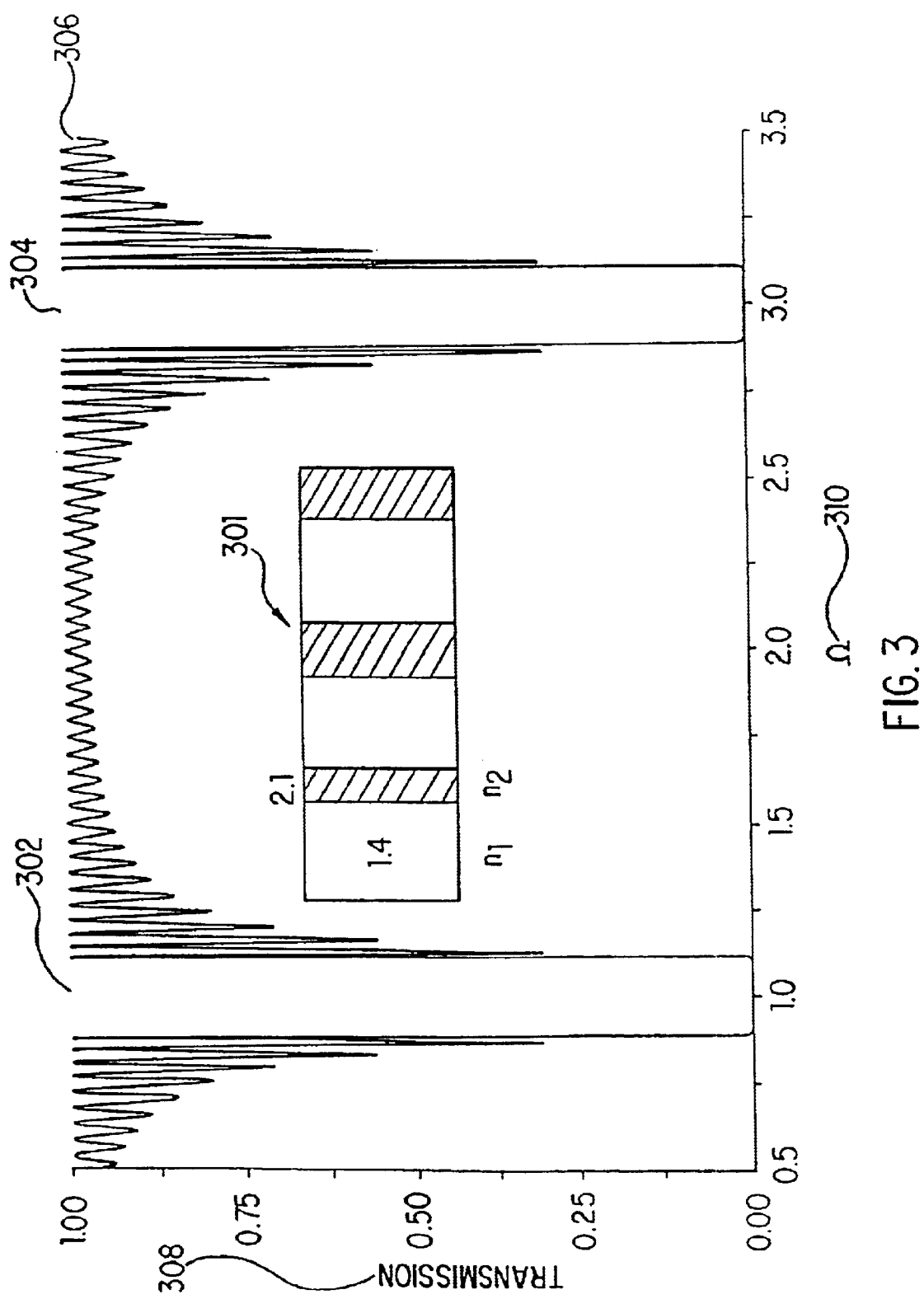
FIG. 3 shows a characteristic transmission profile for a PBG device for third harmonic generation according to the present invention.

The types of structures discussed above result in a PBG structure in which a range of frequencies about some reference frequency cannot propagate inside a PBG device. On the other hand, the structure may be transparent to other frequencies away from the band gap. For example, a representative photonic band gap structure is shown in FIG. 3, which shows a characteristic transmission profile for structure 301. At higher frequencies, higher order gaps may also appear, to create a series of gaps, which may be useful for either up or down-conversion processes. Under ordinary circumstances, higher order gaps are ignored. In FIG. 3, both the first order band gap 302 and second order band gap 304 are depicted. Typically, a uniform PBG structure, such as that shown in FIG. 1A, exhibits an infinite number of photonic band gaps and band edges. In FIG. 3, transmission profile 306 is obtained by plotting the optical transmission 308 as a function of normalized frequency ($\Omega$) 310, where $\Omega=\omega/\omega_0$. The maximum possible transmission is 1, which corresponds to 100%. Therefore, it is the absence of those frequencies from the transmitted spectrum that gives rise to the name "band gap", in analogy to the electronic band gap of semiconductors where electrons having a specific range of energies cannot propagate inside a semiconductor crystal.

At frequencies outside the photonic band gap, the properties of the structures are such that a series of transmission resonances are obtained. The number of such resonances is equal to the number of periods that make up the structure. The bandwidth of said resonances is a sensitive function of the total number of periods, the indices $n_1$ and $n_2$, and their difference $\delta n=|n_2-n_1|$, also known as index modulation depth.

In regard to SH generation, a PBG structure can be formed where nonlinear gain, or the production of SH signal, is maximized. Using the calculations described in detail below, the equations that describe the propagation of electromagnetic waves in PBG structures can be solved. The results of the calculations show that if light signal interacts with a nonlinear $\chi^{(2)}$ medium to produce a SH signal, then the SH energy output from the PBG structure is in this case approximately three orders of magnitude greater than the energy output from a bulk, phase matched nonlinear medium of approximately the same length. Conditions and structure design can be improved to further enhance conversion rates.

One embodiment of the present invention is a PBG structure that comprises 20 periods (or 40 layers) of alternating layers of GaAs and AlAs. Alternatively, the PBG structure can also comprise different sets of materials, for example, air and GaAs, glass and AlAs, AlN and GaN, AlN and $SiO_2$, or a combination of other dielectric materials, as well as with materials that would not conventionally be considered as nonlinear materials. In addition, the PBG structure may also be created in an optical fiber, in the form of a fiber grating. This illustrates that this frequency conversion capability is not specific to any one material, and that some flexibility exists according to the specific needs of a particular application. Accordingly, the structure of the present invention should not be limited solely to the embodiments described herein.

According to the present invention, a pulse of light of about one picosecond or more (more here means that is possible to think of an incident plane wave) in duration can be tuned to the frequency corresponding to the maximum of the first transmission resonance away from the low frequency band edge. This is shown schematically in FIG. 4, which plots group index as a function of normalized frequency. The total energy of a signal produced at twice the frequency of a pump (i.e., at the SH frequency) is about 1000 times greater than the energy output of a QPM device of similar nonlinear properties and dimensions, but that does not exhibit a photonic band gap structure. Accordingly, the signal generated at the second harmonic frequency is tuned to the second transmission resonance of the low frequency band edge of the second order gap, as shown in FIG. 4.

According to the present invention, if the enhancement of any other frequency is desired, for example, the difference or the sum of the incident frequencies, it will be apparent to one of skill in the art based on the present description to devise a PBG structure such that both the pump and the desired frequency are both tuned to a photonic band transmission resonance. If higher conversion efficiencies are sought, the calculations explained in detail below indicate that such conversion efficiency increases can be accomplished with only modest increases in the number of periods that comprise the structure. The reason for this is that the conversion efficiency in a typical PBG structure is sensitive to the length of the structure. For example, if N is the number of periods comprising the device, then the energy output is approximately proportional to the $N^6$. In contrast, for a bulk, QPM material, the conversion efficiency is proportional only to $N^2$. As would be apparent to one of skill in the art based on the present description, an optimization procedure can then be employed to produce the ideal parameters for the up- or down-conversion process for a particular application.

Figure 5:
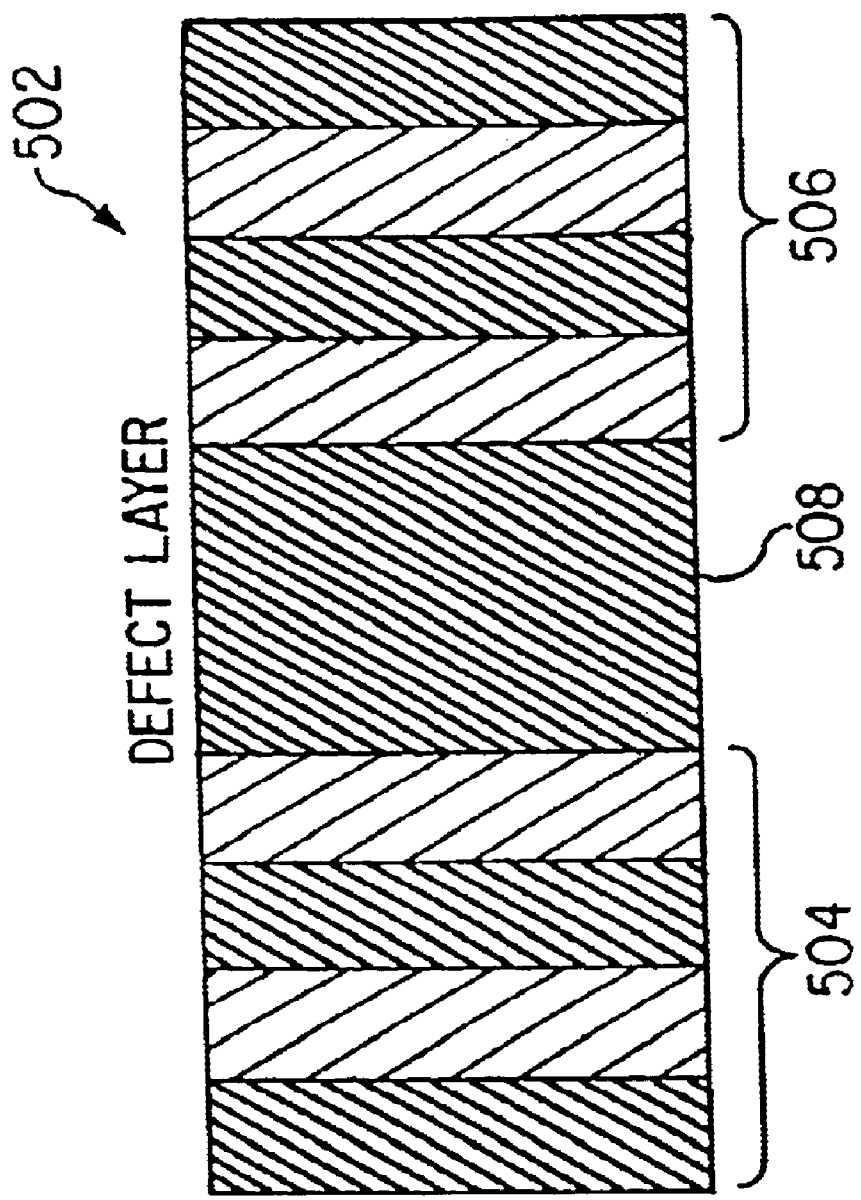
FIG. 5 shows one embodiment of the present invention, a PBG device with a periodicity defect region.

For example, in the case of third harmonic generation, a PBG structure comprises a quarter-wave periodic structure with a "defect" layer one half wavelength thick at the center of the structure. This embodiment is shown schematically in FIG. 5. Device 502 comprises at least two stacks (or regions) 504 and 506 of alternating layers of refractive materials similar to those described above in connection with FIG. 1A. In the center of device 502, a periodicity defect region 508 is interposed (or placed) between stacks 504 and 506, with each stack having an equal number of alternating layers of refractive material. Defect region 508 is also a refractive material that can have an index of refraction (n) that is equivalent to either $n_1$ or $n_2$, and with the same $\chi^{(2)}$ nonlinear coefficient. For example, if individual layer thicknesses in the uniform stacks 504 and 506 are taken to be one quarter-wavelength long, then the thickness of periodicity defect region 508 can be one half or one wavelength in thickness. However, other thicknesses for periodicity defect region 508 can also be utilized. The term "defect", in this context, simply means a break in the periodicity of the structure.

Figure 6:
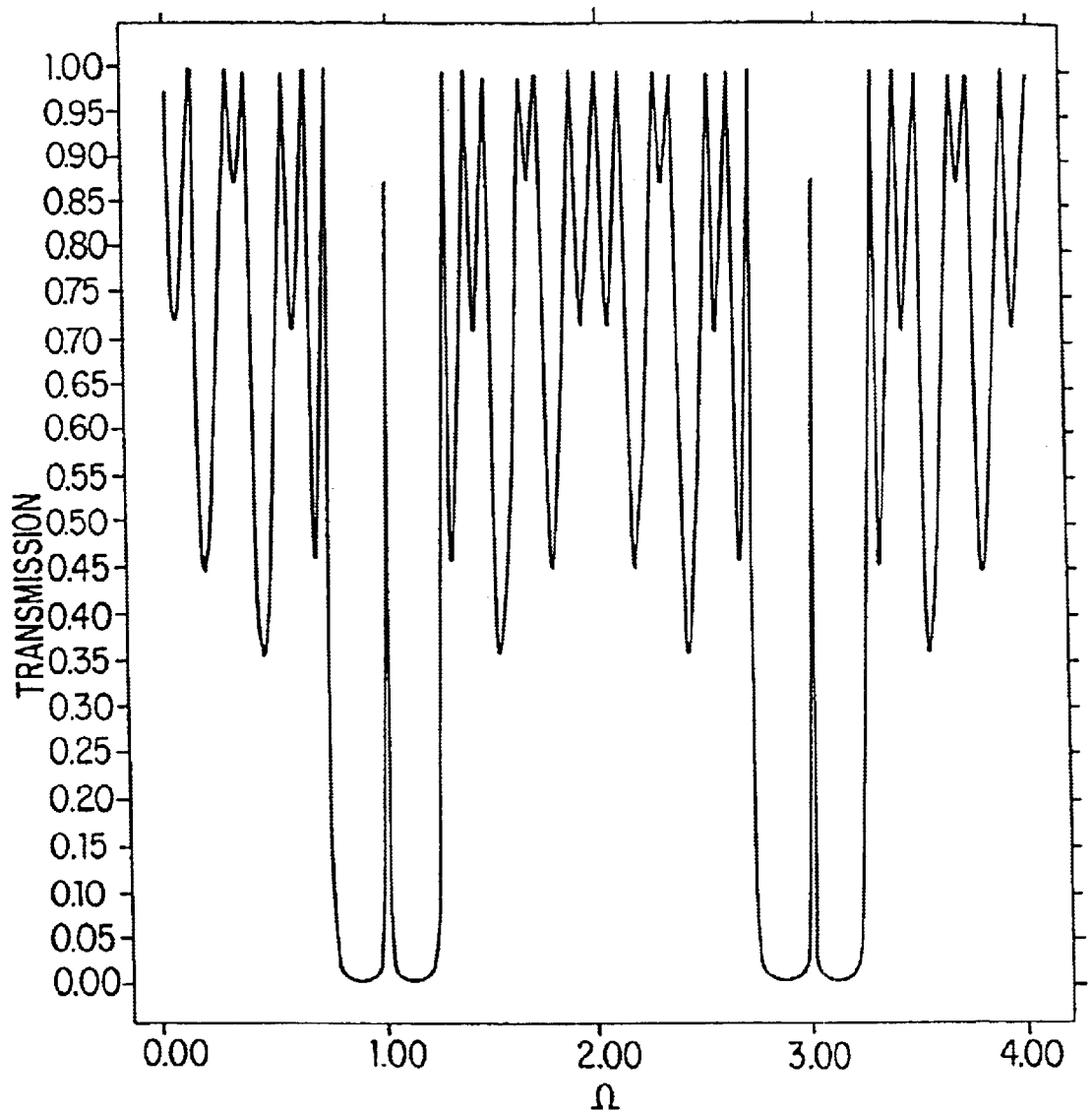
FIG. 6 is a diagram of the characteristic index of refraction profile of the PBG structure shown in FIG. 5.

This defect layer breaks the periodicity in such a way that it generates a transmission resonance in the middle of every gap, as shown in FIG. 6. Here, the distance between the center of the first and second order gap is exactly a factor of three. Therefore, tuning the pump signal to the center of the first order gap will enhance the generation of light at the third harmonic. For example, using a pump signal wavelength of approximately 1550 nm, such as found in conventional communications laser diodes, a third harmonic signal will be output from the PBG device at a wavelength of approximately 516 nanometers (nm). Therefore, by selecting the proper set of parameters, such as material type, material parameters, and the exact geometrical properties of the materials (i.e., layer thickness), a person of skill in the art can arrive at a device with the desired properties.

Another embodiment of the present invention is a PBG device comprising a plurality of periodicity "defects." In other words, several defects of varying thicknesses can be placed in a PBG device. The placement of these multiple defects between stacks of alternating layers forms an a-periodic structure that also exhibits a photonic band gap structure. This a-periodic structure can be utilized to perform any of the frequency conversion techniques described herein, as would be apparent to one of skill in the art based on the present description.

According to the present invention, conversion efficiencies can be even higher for structures with an increased number of periods. For example, by increasing the structure length by 50% (from 20 to 30 periods), the energy output can increase by a factor of 5. However, it should be noted that: (1) the transmission resonance bandwidth decreases as $1/N^2$, where N is the number of periods, so that the pulse duration needs to be increased in order to ensure large pump enhancement inside the structure; and (2) a material breakdown may occur because of excessive electric-field buildup, or enhancement, inside the PBG structure.

Consideration of nonlinear effects highlight even more dramatic differences between the PBG structures of the present invention and conventional nonlinear materials used for frequency conversion. Typical nonlinear index changes in GaAs or AlAs layers can be of order $\delta n_{NL} \approx 10^{-3}$. This implies that nonlinear index shifts can be larger than the linear index modulation depth found in optical fibers. Consequently, the location of the gap on the frequency axis can shift dramatically to higher or lower frequencies, and its bandwidth can increase or decrease significantly, depending on the sign of the nonlinearity.

The frequency bandwidth of an ultrashort pulse of only a few hundred optical cycles in duration (i.e., in the femtosecond regime) can be smaller (depending on the wavelength) than the bandwidth of the PBG's first transmission resonance peak, where the group velocity is a minimum. Here, ultrashort pulse propagation can be nondispersive, i.e., the pulse propagates without breaking up or distortions. In addition, the nonlinear index change remains orders of magnitude smaller than the index modulation depth, which for PBG structures can be of order unity or larger. Thus, gap and transmission resonance bandwidths, and their locations are only marginally altered, although under the right conditions changes may be sufficient for the onset of optical limiting and switching, optical diode behavior, and strong pulse reshaping.

The stability of the band structure in the frequency domain is also important in parametric optical up- and down-conversion, and harmonic generation. This result highlights the fact that a new generation of compact and efficient high gain optical amplifiers and optical parametric oscillators based on photonic band-edge effects can be achieved according to the present invention.

The enhancement of gain in these PBG structures is understood by recalling that the density of accessible field modes in the vicinity of dielectric boundaries is modified by the boundary. This means that if a linear or nonlinear gain medium is introduced with in a PBG structure, the stimulated and spontaneous emission rates are modified according to Fermi's golden rule (see below). In QPM structures, a minimization of the phase difference between the waves is desirable in order to avoid a phase mismatch in the continuous wave case. For QPM devices, this minimization of phase difference is typically achieved by poling the active material, which is uniform in its composition and contains no linear index discontinuities. Accordingly, the nonlinear coefficient only alternates sign in the longitudinal direction every few tens of micrometers (μm).

For the PBG structures of the present invention, the unusually strong confinement of both the pump and the SH signal that occurs near the photonic band edges is relied upon. Where the density of electromagnetic field modes is large and the group velocity is low, the field amplitude may be enhanced over bulk values by one order of magnitude or more, and strong pump and SH mode overlap occurs. In this regime, the material is not poled in the usual manner; it is the geometrical properties of the structure that cause strong mode overlap, co-propagation, larger interaction times, and exact phase matching, the combination of which is ultimately responsible for the enhanced gain of these PBG structures.

The PBG structures discussed above can be manufactured by conventional techniques. Other suitable modifications and adaptations of the variety of reaction conditions and parameters normally encountered in preparing photonic and semiconductor devices will be apparent to those skilled in the art, without departing form the spirit and scope of the invention.

As discussed above, the invention can be implemented in group III–V or II–VI material systems, as well as with dielectric materials. For purposes of explanation, the above examples are described in GaAs/AlAs material systems, but it will be understood by those skilled in the art that the invention described herein can also be implemented with other III–V or II–VI systems.

Further, background material concerning semiconductor solid-state physics may be found in a number of references including two books by S. M. Sze, titled: *Physics of Semiconductor Devices,* John Wiley and Sons, Inc., New York (1981), and *Semiconductor Devices, Physics and Technology,* John Wiley and Sons, Inc., New York (1985), both of which are incorporated herein by reference. Those skilled in the art can readily manufacture the layered devices disclosed according to conventional processing techniques without undue experimentation.

4. Example Applications

The PBG structures of the present invention can be utilized to perform a variety of frequency conversion techniques. As described above, a mixed quarter-half-wave structure can be utilized to perform SH generation of a variety of coherent light sources, including tunable solid state lasers, gas lasers and semiconductor diode lasers. For example, a PBG structure can be placed at the output facet of a conventional AlGaAs diode laser that emits a laser beam at a wavelength of approximately 810 nm. Diode lasers of various output wavelengths are commercially available from a number of commercial vendors, including Spectra Diode Labs, Inc. and Coherent Inc., both of California. By choosing the proper set of alternating layer materials, by selecting an appropriate set of layer thicknesses, and by choosing an appropriate number of periods for the PBG device, an output at approximately 405 nm can be achieved from the PBG device. This type of device would be outputting "blue" laser emission, which is extremely valuable for communications and optical storage applications, for example. In addition, because of the compact size and angular independence of the PBG device (as opposed to conventional non-linear materials such as potassium dihydrogen phosphate (KDP), β-barium borate (BBO), lithium triborate (LBO), which are extremely dependent upon angular alignment), SH generation optical cavity arrangements (e.g., external cavity and intra-cavity designs) would be very straightforward to design. Typical optical layouts for harmonic generation are well known. See e.g., W. Koechner, "Solid-State Laser Engineering," Springer-Verlag, $2^{nd}$ Ed. (1988), especially Chapter 10, which is incorporated by reference herein. Known anti-reflection coatings can also be utilized to reduce spurious reflections, as would be apparent to one of skill in the art.

In addition, the PBG structures of the present invention can also be utilized in parametric oscillation techniques where, for example, output wavelengths greater than the pump pulse wavelengths can be generated. Based on the known methods of optical parametric oscillation, such as those described in the Koechner reference, it would be apparent to one of skill in the art to design a parametric device utilizing the PBG structure of the present invention to achieve frequency conversion at lower frequencies (i.e., longer wavelengths).

Further, optical fiber gratings can be designed similar to the types of PBG structures described above. Optical fiber gratings are also periodic structures. The index of refraction for a fiber grating can achieve an index modulation depth (i.e., a high and low value) similar to that of high index contrast semiconductor structures. However, fiber gratings are structures with a smaller index discontinuity than that associated with a semiconductor PBG structure: for a fiber grating an index modulation along its core is typically on the order of $\delta n=10^{-3}$ to $10^{-4}$, as opposed to a semiconductor PBG structure with an index modulation approaching unity. Since the bandwidth of transmission resonances and band gaps are proportional to $\delta n$ (the index modulation depth), fiber grating frequency conversion devices are preferred for use with optical pulses of longer (i.e., nanosecond) duration in order to preserve their shape.

A fiber grating can be created on an optical fiber by well-known fabrication techniques. For example, see the fiber grating applications and fabrication techniques described in "Continuously tunable single-mode erbium fiber laser," by G. Ball and W. Morey, *Optics Letters,* Vol. 17, No. 6, p.420 (1992) and "Spatially-multiplexed fiber-optic bragg grating strain and temperature-sensor system based on interferometric wavelength shift," by Y. Rao, et al., *Electronics Letters,* Vol. 31, No. 12, p. 1009 (1995), which are both incorporated by reference in their entirety.

For example, fiber grating fabrication can be accomplished by placing an optical "mask" over a photo-sensitive fiber core and then by illuminating the mask-fiber assembly with a high intensity ultraviolet light beam, such as an Excimer laser. The resulting grating, referred to as a fiber grating, displays much the same properties of a high index contrast semiconductor PBG structure, especially with respect to band gaps and transmission resonances. In addition, a mask can be designed to create a grating that imparts either a band-edge effect or a transmission resonance similar to the one shown above in FIG. 5. Based on the present description, it would be apparent to one of skill in the art to design a fiber grating capable of frequency conversion. For example, a fiber grating device designed according to the parameters discussed above can be coupled to the output of a laser diode to produce a compact source capable of output emissions in the blue wavelength range.

5. Model

1. Equations

According to the present invention, a model can be utilized to allow one of ordinary skill in the art to design a PBG structure to perform optical frequency conversion for a desired application. For example, shown here is an analysis describing the dynamics associated with ultrashort pulses (about 1 ps or less) in one-dimensional systems. This model extends the analysis of SH generation and enhancement to arbitrarily deep PBG gratings in the pulsed regime by directly integrating Maxwell's equations in the time domain.

Figure 7:
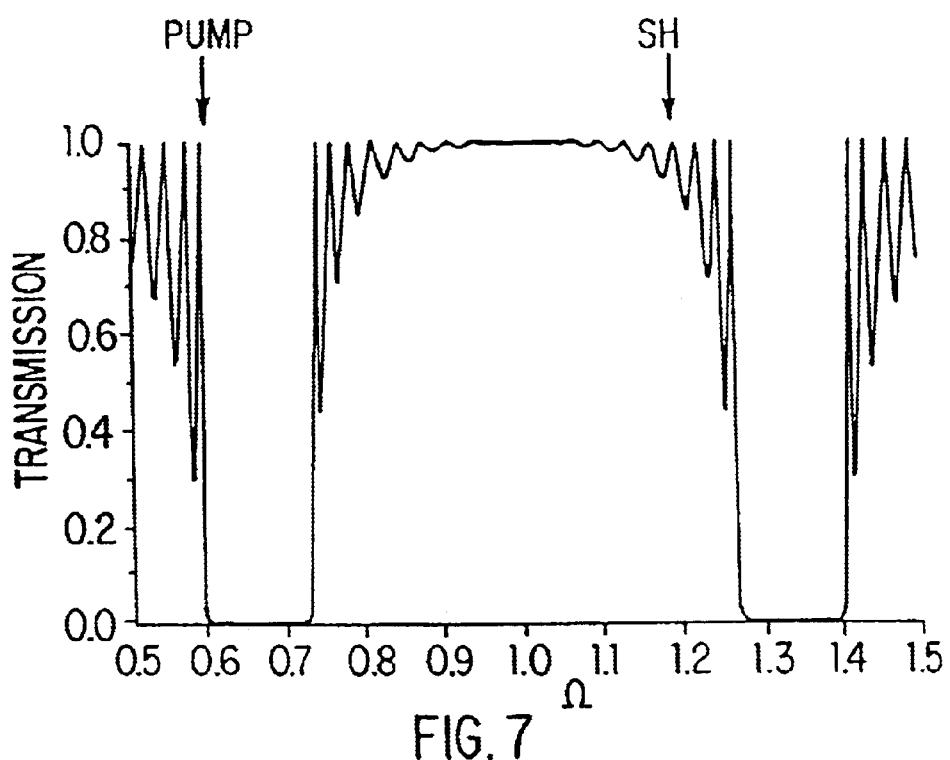
FIG. 7 shows a transmission versus normalized, dimensionless frequency for a 20-period, half-quarter-wave stack.

Consider the following simple one-dimensional system similar to device 200 shown in FIG. 2. The example device comprises 40 dielectric layers (20 periods in all, roughly 12 $\mu$m thick for a reference wavelength of 1 $\mu$m), and the index of refraction alternates between a high and a low value, $n_2=1.42857$ and $n_1=1$. A small value of $\chi^{(2)} \approx 0.1$ pm/V (roughly $3 \times 10^{-9}$ cm/statvolt in Gaussian units) is chosen and it is assumed that the nonlinear material is distributed uniformly throughout the PBG structure. Then, for a reference wavelength $\lambda_0$, the layers have thicknesses $a=\lambda_0/(4n_1)$ and $b=\lambda_0/(2n_2)$, respectively. This forms a mixed half-quarter-wave stack for wavelength $\lambda_0$. A range of frequencies is reflected, as shown in FIG. 7, where the transmission coefficient for this structure is plotted as a function of the scaled frequency $\Omega=\omega/\omega_0$, where $\omega_0=2\pi c/\lambda_0$. FIG. 7 indicates that this choice of parameters causes the location of the second-order gap to be removed from the first-order gap by approximately a factor of 2. For an ordinary quarter-wave structure, such as the device shown in FIG. 1, a factor of 3 separates the first- and second-order band edges. Utilizing these two edges is more suitable for third-harmonic generation.

The equations of motion can be derived beginning with Maxwell's equation for the total field, in Gaussian units, and can be written as:

$$\frac{\partial^2}{\partial z^2}E(z,t) - \frac{n^2}{c^2}\frac{\partial^2}{\partial t^2}E(z,t) = \frac{4\pi}{c^2}\frac{\partial^2}{\partial t^2}P_{NL}. \quad (1)$$

Here, $P_{NL}$ is the total nonlinear polarization. Without loss of generality, the fields can arbitrarily and conveniently be decomposed as follows:

$$E(z,t)=\epsilon_\omega(z,t)e^{i(kz-\omega t)}+c.c.+\epsilon_{2\omega}(z,t)e^{2i(kz-\omega t)}+c.c., \quad (2)$$

$$P_{NL}(z,t)=\rho_\omega(z,t)e^{i(kz-\omega t)}+c.c.+\rho_{2\omega}(z,t)e^{2i(kz-\omega t)}+c.c. \quad (3)$$

This decomposition highlights the fundamental and second-harmonic angular frequencies. The nonlinear polarization can be expanded in powers of the electromagnetic field strength as follows:

$$P_{NL}(z,t) = \chi^{(2)}E^2(z,t) = \quad (4)$$
$$2\chi^{(2)}\epsilon_\omega^*(z,t)\epsilon_{2\omega}(z,t)e^{i(kz-\omega t)} + c.c. + \chi^{(2)}\epsilon_\omega^2(z,t)e^{2i(kz-\omega t)} + c.c.$$

While one can assume an initial left- or right-propagating pump pulse, the SH signal is initially zero everywhere. The direction of propagation of the spontaneously generated SH field and the exact nature of the quasi-standing wave inside the structure are dynamically determined by (a) the nature of the initial and boundary conditions, (b) pump-frequency tuning with respect to the band edge, and (c) the distribution of nonlinear dipoles inside the structure. This nonlinear dipole distribution can significantly affect the results. SH generation is a phase-sensitive process. The field and its phase at any point inside the structure are a superposition of all fields originating everywhere else inside the structure. Thus, the phase is important element that should be included in the integration of the equations of motion. However, dipole distribution is important to the extent that it is modified in the layers where the fields happen to be localized. For example, near the low-frequency band edges, the fields are localized in the high-index layers. Modifying the nonlinear medium distribution in the low-index layers will have little effect, although some mode overlap between layers always occurs.

For this model, ultrashort incident pulses propagating in the presence of large index discontinuities are considered. Therefore, all second-order spatial derivatives should be retained in order to properly include boundary conditions. However, it can be assumed that pulse envelopes have a duration that is always much greater than the optical cycle, thus allowing the application of the slowly varying envelope approximation in time (SVEAT) only. For a general description of SVEAT, see Scalora, M., et al., *Phys. Rev. Lett.* 73:1368 (1994) and references therein, which is incorporated by reference herein in its entirety. The equations of motion for the fundamental and the second-harmonic fields can be derived as follows. First, substituting Eq. (2) into Eq. (1) yields:

$$\frac{\partial^2 \epsilon_\omega}{\partial z^2} + 2ik\frac{\partial \epsilon_\omega}{\partial z} - k^2 \epsilon_\omega - \frac{n_\omega^2}{c^2}\frac{\partial^2 \epsilon_\omega}{\partial t^2} + \frac{2i\omega n^2}{c^2}\frac{\partial \epsilon_\omega}{\partial t} + \frac{\omega^2}{c^2}n_\omega^2 \epsilon_\omega = \quad (5)$$
$$\frac{4\pi}{c^2}\left(\frac{\partial^2}{\partial t^2}\rho_\omega - 2i\omega\frac{\partial}{\partial t}\rho_\omega - \omega^2\rho_\omega\right),$$

$$\frac{\partial^2 \epsilon_{2\omega}}{\partial z^2} + 4ik\frac{\partial \epsilon_{2w}}{\partial z} - 4k^2 \epsilon_{2\omega} - \frac{n_{2\omega}^2}{c^2}\frac{\partial^2 \epsilon_{2\omega}}{\partial t^2} + \frac{4i\omega}{c^2}n_{2\omega}^2 \frac{\partial \epsilon_{2\omega}}{\partial t} + \quad (6)$$
$$4\frac{\omega^2}{c^2}n_{2\omega}^2 \epsilon_{2\omega} = \frac{4\pi}{c^2}\left(\frac{\partial^2}{\partial t^2}\rho_{2\omega} - 4i\omega\frac{\partial}{\partial t}\rho_{2\omega} - 4\omega^2 \rho_{2\omega}\right)$$

where $k=\omega/c$, and the SVEAT is made. This choice of wave vector is simply an initial condition consistent with a pump field of frequency $\omega$ initially propagating in free space, located away from any structure. Any phase modulation effects that ensue from propagation (i.e., reflections and nonlinear interactions) are accounted for in the dynamics of the field envelopes. The inclusion of all second-order spatial derivatives in the equations of motion means that reflections are accounted for to all orders, without any approximations. Therefore, assuming that pulses never become so short as to violate SVEAT (usually this means a few tens of optical cycles if propagation distances are on the order of pulse width), neglecting all but the lowest order temporal contributions to the dynamics, and using the nonlinear polarization expansions of Eqs. (4), Eqs. (5) and (6) become:

$$n_\Omega^2 \epsilon_\Omega(\xi,\tau) = \frac{i}{4\pi\Omega}\frac{\partial^2 \epsilon_\Omega}{\partial \xi^2} - \frac{\partial \epsilon_\Omega}{\partial \xi} + i\pi(n_\Omega^2-1)\Omega\epsilon_\Omega + i8\pi^2\Omega\chi^{(2)}\epsilon_\Omega^*\epsilon_{2\Omega}, \quad (7)$$

$$n_{2\Omega}^2 \epsilon_{2\Omega}(\xi,\tau) = \quad (8)$$
$$\frac{i}{8\pi\Omega}\frac{\partial^2 \epsilon_{2\Omega}}{\partial \xi^2} - \frac{\partial \epsilon_{2\Omega}}{\partial \xi} + i\pi(n_{2\Omega}^2-1)2\Omega\epsilon_{2\Omega} + i8\pi^2\Omega\chi^{(2)}\epsilon_\Omega^2.$$

Here $\xi=z/\lambda_0$, and $\tau=ct/\lambda_0$. Equation (8) describes the rate of change of the SH field, whereas equation (7) describes the pump (or fundamental) signal. The spatial coordinate z has been conveniently scaled in units of $\lambda_0$; the time is then expressed in units of the corresponding optical period. Thus, by knowing the indices of refraction for the layers of the PBG device, the pump signal frequency and bandwidth, and the pump signal intensity, one can design a PBG structure to yield a desired output signal having a frequency different from the pump signal.

As discussed, both forward and backward SH generation can occur. In other words, a frequency conversion device can either transmit or reflect the output harmonic signal. Additionally, assuming that the medium is dispersionless, and the pump signal is tuned at the low-frequency band-edge transmission resonance, then the SH frequency is found well away from the second-order band edge: it is tuned in the middle of the pass band, as indicated in FIG. 7. In order to properly tune the SH signal frequency near the band edge, material dispersion is introduced. This causes changes in the band structure. Specifically, all higher-order gaps tend to move down in frequency, causing the SH signal to be tuned closer to the low-frequency, second-order band edge, where the electromagnetic density of states is largest.

From a calculational standpoint, varying the amount of dispersion is strightforward to undertake. From a fabrication standpoint, obtaining the same conditions can be more difficult. However, the inventors find that the band structure and its features are strongly influenced by (a) the number of periods, (b) layer thickness, and (c) material dispersion. For example, increasing (or decreasing) the number of layers sharpens the band edges, and increases (or decreases) the number of transmission resonances between gaps, causing an effective shift of each resonance. Changing layer thickness away from the quarter- or half-wave conditions (in units of $\lambda_0$) can also cause frequency shifts in the location of the band gaps and transmission resonances. A structure with the desired properties can be realized when these frequency shifts are coupled with material dispersion.

In order to find the optimal parameters for SH generation, i.e., tuning with respect to the band edge, the index of refraction of the high-index layer is varied from $n_2(2\Omega)=$ 1.42857 to $n_2(2\Omega)=1.65$. The higher-index value corresponds to SH generation just inside the second-order gap, where its suppression is expected. For intermediate values of the index, SH generation also occurs at frequencies where the density of modes is a maximum. The degree of dispersion assumed is typical of the degree of dispersion found in both dielectric or semiconductor materials, 5–10% in this case.

Recall that FIG. 4 shows the group index, defined as $N_g=cdk/d\omega$, for a preferred PBG sample, similar to that shown in FIG. 2. Note that the maximum group index is also a sensitive function of on, the index modulation depth, and the number of periods. The maximum value of the group index for this mixed half-quarter-wave structure is similar in magnitude to that of a quarter-wave, 20-period structure with the same index modulation depth. In this case, $n_2(\Omega)=$ 1.42857, and $n_2(2\Omega)=1.519$. Note also that the magnitude of this function is largest near the high-and low-frequency band edges.

b. Picosecond Input Pulse Model

In this example, the pump pulse frequency is chosen to correspond to the low-frequency band edge, where the transmission resonance is approximately unity and the group index is a maximum ($\Omega=0.591$ in FIG. 2). A high pump index implies that a dramatic increase in the field intensities inside the structure occurs at that frequency. This is important, since SH gain is nonlinear in the field, as Eq. (8) suggests. By choosing the index of refraction such that n2(2Ω)=1.519, the SH frequency coincides with the second density of modes maximum on the low-frequency side of the second-order band gap (see FIG. 4). Here, the total-energy output from the PBG device with respect to the index-matched bulk, which includes forward and backward SH generation, varies from one order of magnitude for a pump pulse only 60 optical cycles in duration (1/e width of the intensity envelope is about 200 femto-seconds (fs) if $\lambda_0=1$ $\mu$m), to approximately 500 times for pulses about 1 ps long.

For sub-picosecond pulses, the enhancement is reduced due to the broad frequency content of the pulse.

SH generation is not at a maximum when the SH signal is tuned at the density of the mode maximum, because the fields do not have the right phase for this to occur. As an example, using the known matrix transfer method, it can be found that the phase of the transmitted, plane-wave field undergoes a $\pi$ phase shift across the gap, and a phase shift of $2\pi$ between consecutive resonances on the same side of any gap. Therefore, the number of periods chosen can have an impact on the overall phase of the SH field inside the structure. For short pulses, the circumstances are much more complicated, because of their broadband frequency makeup.

Here we present a more general effective index theory, which is described in "*Dispersive properties of one-dimensional photonic band gap structures: application to quadratic nonlinear interaction*", by M. Centini et al, which can be used for a more systematic way on how to arrive at the structure's desired properties, namely, a structure where large density of modes and phase matching conditions are obtained. Using the matrix transfer method described in the book by Fowles, for example, we define a general transmission function for any structure as follows:

$$t \equiv x+iy \equiv \sqrt{T}e^{i\phi_t} \quad (9)$$

where $\sqrt{T}$ is the transmission amplitude, $\phi_t = \tan^{-1}(y/x) \pm m\pi$ is the total phase accumulated as light traverses the medium, and m is an integer number. In analogy with the propagation in a homogeneous medium, we can express the total phase associated with the transmitted field as $$\phi_t = k(\omega)D = (\omega/c)n_{eff}(\omega)D, \quad (10)$$

where $k(\omega)$ is the effective wave vector; and $n_{eff}$ is the effective refractive index that we attribute to the layered structure whose physical length is D. As described in M. Centini et al, we obtain the following expression of the effective index of refraction:

$$\hat{n}_{eff} = (c/\omega D)[\phi_t - (i/2)\ln(x^2+y^2)]. \quad (11)$$

Eq.(11) suggests that at resonance, where $T=x^2+y^2=1$, the imaginary part of the index is identically zero. We can also define the effective index as the ratio between the speed of light in vacuum and the effective phase velocity of the wave in the medium. We have $$\hat{k}(\omega) = \frac{\omega}{c}\hat{n}_{eff}(\omega) \quad (12)$$

This is the effective dispersion relation of the finite structure. For periodic structures, the phase matching conditions are automatically fulfilled if the fields are tuned at the right resonance peaks of the transmission spectrum. Using the formalism introduced in J. M. Bendickson et el, *Phys. Rev E* 53, 4107 (1996), the expression for the effective index for the N-periods finite structure can be recast as follows:

$$\hat{n}_{eff} = \frac{c}{\omega Na}\left\{\tan^{-1}[z\tan(N\beta)\cot(\beta)] + Int\left[\frac{N\beta}{\pi}+\frac{1}{2}\right]\pi\right\}, \quad (13)$$

where $\beta$ is the Bloch's phase for an infinite structure having the same identical unit cell as the finite structure in question. Eq.(13) contains additional information regarding the location of the resonances where phase-matching for a general multi-wave mixing (MWM) process can occur. For illustration purposes, we consider the usual 20-period, mixed half-wave/eighth-wave periodic structure. We choose this arrangement because it allows easy tuning of all the fields near their respective band edges, thus allowing us to simultaneously access a high density of modes for all fields. We note that this arrangement is not unique, in that higher or lower order band edges can be combined to yield the phase matching conditions, within the context of the effective index approach outlined in M. Centini et al. For simplicity, we consider the second harmonic generation process and assume a pump field is tuned at frequency ω; the interaction via a $\chi^{(2)}$ process then generates a down-converted signal at a third frequency $\omega_2 = 2\omega$. First, we tune the field of frequency ω; at the first resonance near the first order band edge; this insures the highest density of modes possible. We have:

$$\beta_1 = \frac{\pi}{N}(N-1) \tag{14}$$

This expression fixes the phase of the first field. Since we are interested in second harmonic generation, we need to impose the conditions on the third generated field, namely:

$$K_2(\omega_2) - K_1(\omega_1) = 0 \tag{15}$$

Expression (15) fixes the condition through which exact phase matching, and hence high conversion efficiency, can be obtained. We have ensured a high density of modes by tuning near the band edge. Substituting (14) and (15) into (13), we obtain $$\beta_2 = \frac{\pi}{N}(2N-2) \tag{16}$$

which is the value of the Bloch's phase that will correspond to the field at frequency 2ω. This means that phase-matching conditions will be satisfied for this structure if the thickness of the layers are combined with material dispersion such that the pump field is tuned to the first resonance away from the low frequency band edge of the first order gap (N−1). Then the second harmonic field must be tuned to the second resonance (2N−2) near its band edge. The procedure outline can be repeated for a number of fields, for either up or down-conversion, and the results agree well with the numerical model outlined above.

Figure 8:
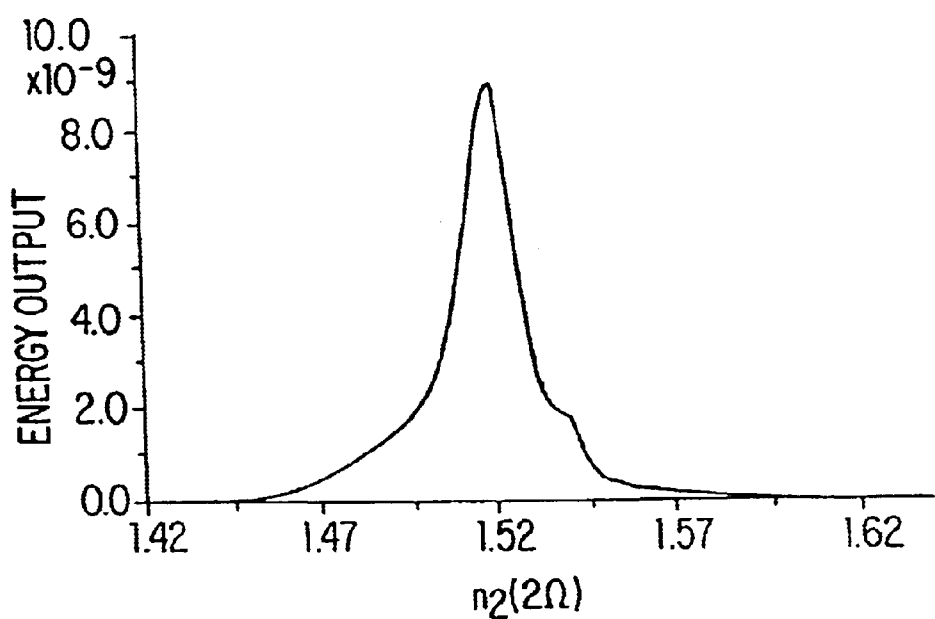
FIG. 8 shows maximum energy output versus index of refraction.

FIG. 8 shows the calculated SH energy output for a 1 ps pulse, as a function of n2(2Ω), i.e., dispersion. The maximum energy output occurs when $n_2(2\Omega)=1.519$, which corresponds to the second transmission or group index maximum, a value that satisfies the phase-matching conditions established by Eqs.(15–16) above. The band structure for $n_2=1.519$ is illustrated in FIG. 4. Evidence of the curvature of the band structure near the band edge is rather weak away from the second transmission resonance. These results demonstrate that the dipole distribution is also an important factor. In this case, the SH field is generated inside the structure from a continuous distribution of nonlinear dipoles; the nonlinearity is in both the high and low index layers. This dipole distribution determines the form of the propagating eigenmode, and the manner in which the generated signal leaves the structure. Therefore, as would be apparent to one of skill in the art based on the present description, one can likely find a nonlinear dipole distribution that will maximize or further improve SH conversion efficiency.

The above calculations also highlight the importance of pulse width. Pulses whose spectral widths are larger than the band-edge transmission resonance tend to couple poorly with the structure. This situation leads to dispersive propagation, and to only slightly enhanced field intensities inside the PBG structure. On the other hand, a pulse whose frequency band-width is smaller than the band-edge resonance bandwidth has fewer frequency components, experiences little or no dispersion, and allows the field to build up inside the structure by about one order of magnitude or more with respect to its free space or bulk values, where the field amplitude is in general proportional to $E_{free}/n$.

Figure 9:
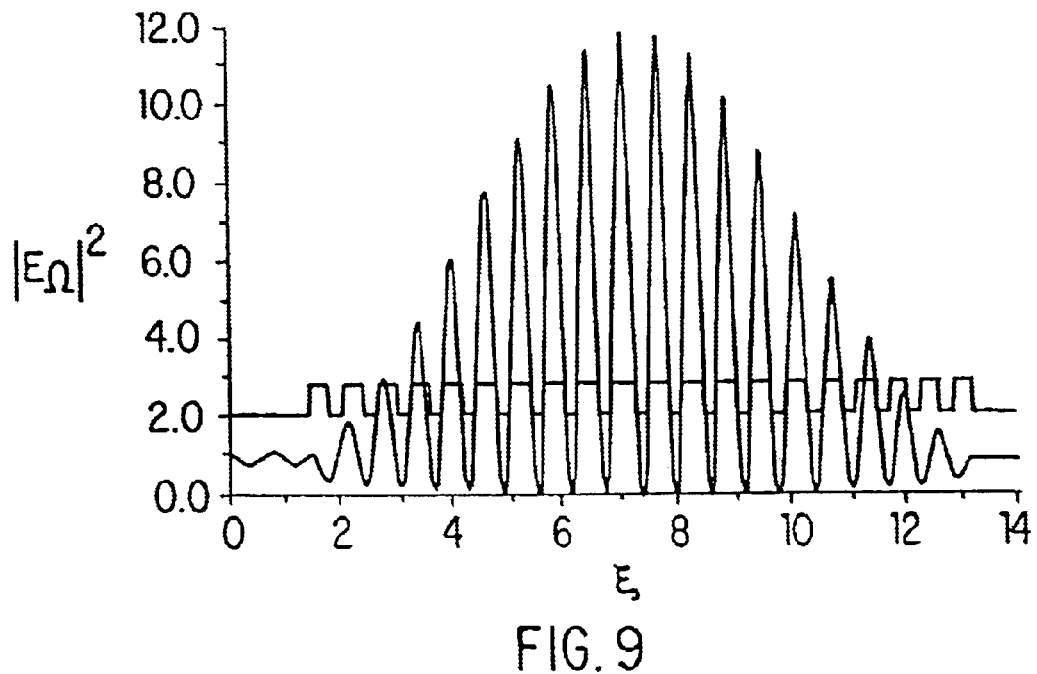
FIG. 9 shows the pump field eigenmode distribution inside a PBG structure of the present invention, at the instant that the peak of the pulse reaches the PBG structure.
Figure 10:
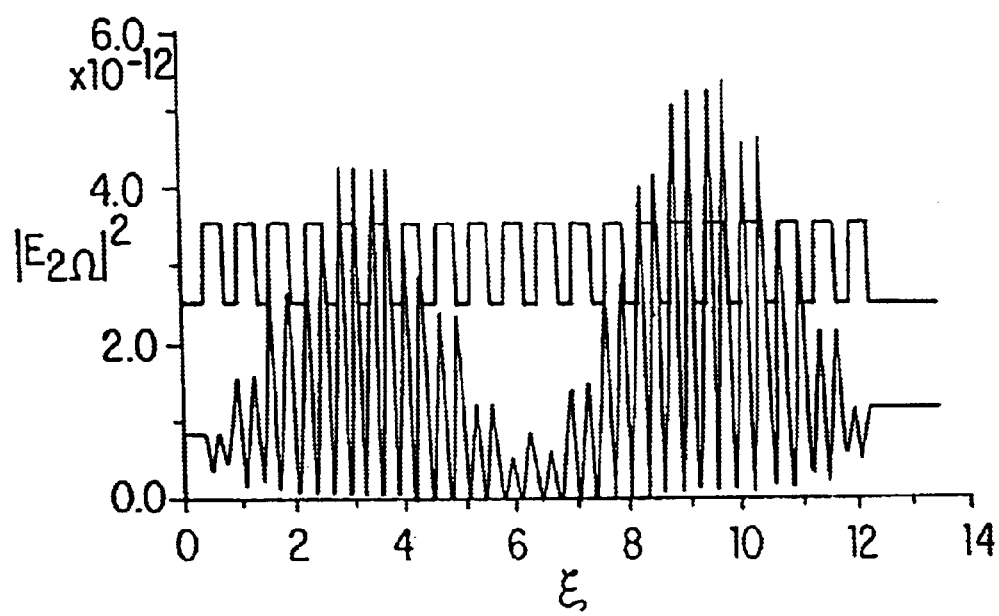
FIG. 10 shows a second-harmonic eigenmode for the case of FIG. 9.

For example, FIG. 9 plots the pump-field intensity inside the structure, at the instant the peak of the 1-ps pulse reaches the structure. As the pulse slows down dramatically, the maximum field intensity is amplified by more than one order of magnitude (compared to its peak value outside the structure) by linear interference effects of backward- and forward-traveling components. FIG. 10, on the other hand, represents the SH field intensity quasistanding-wave pattern at the same instant in time as FIG. 9. Both eigenmodes overlap to a large extent inside the high index layers, and the fields propagate in this configuration for the entire duration of the pump pulse. This mode overlap, combined with the dramatic group velocity reduction for both fields, allows efficient energy exchange between the pump and the SH signal.

Figure 11:
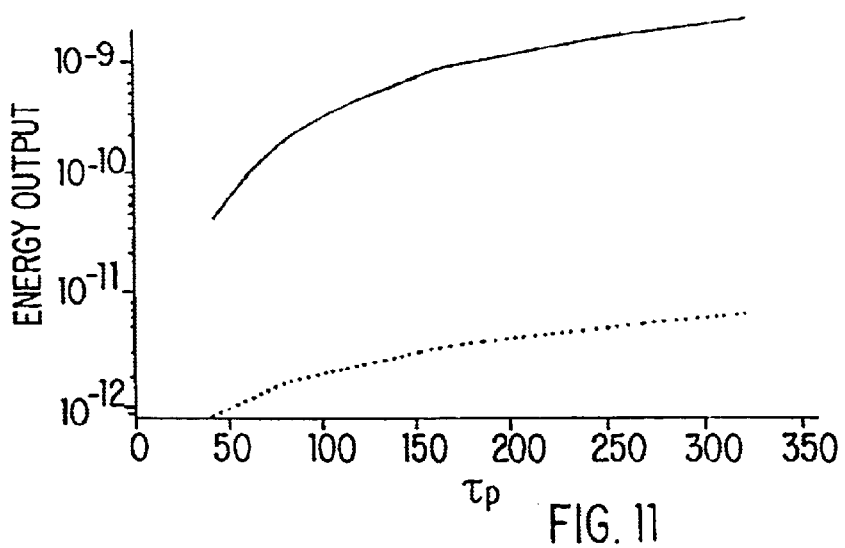
FIG. 11 shows comparison between the SH energy output from the PBG (solid line) and a phase-matched bulk material (dotted line), as a function of pulse width.

FIG. 11 shows the total-energy output (forward and backward included) as a function of incident pulse width, expressed in optical cycles, for a 20-period, 12-μm-thick device (solid line), and a 12-μm bulk sample coated with anti-reflection layers at both ends to minimize pump reflections (dotted line). Low input field intensities are considered that yield conversion efficiencies on the order of $10^{-12}$, although this trend persists as long as pump depletion is not significant. For clarity, the abscissa is plotted on a logarithmic scale. FIG. 11 shows that the total-energy output (and therefore power output) becomes about 500 times greater for the PBG sample than for index-matched bulk material when an input pulse width approaches 300 optical cycles, or about 1 ps. The results indicate that at these length scales the energy output for the bulk sample increases linearly with incident pulse width. Thus, this figure clearly demonstrates that suitable output energies can be obtained from the PBG devices of the present invention when continuous wave input pulses are applied.

In contrast, an early exponential increase characterizes energy growth in the PBG case, giving way to linear growth only when pulse width approaches 1 ps. This implies that the pump field eigenmode intensity (and hence SH gain) increases rapidly with pulse width, saturating when a quasi-monochromatic limit is reached, in this case, when pulse frequency bandwidth is somewhat less than band-edge resonance bandwidth.

Figure 12:
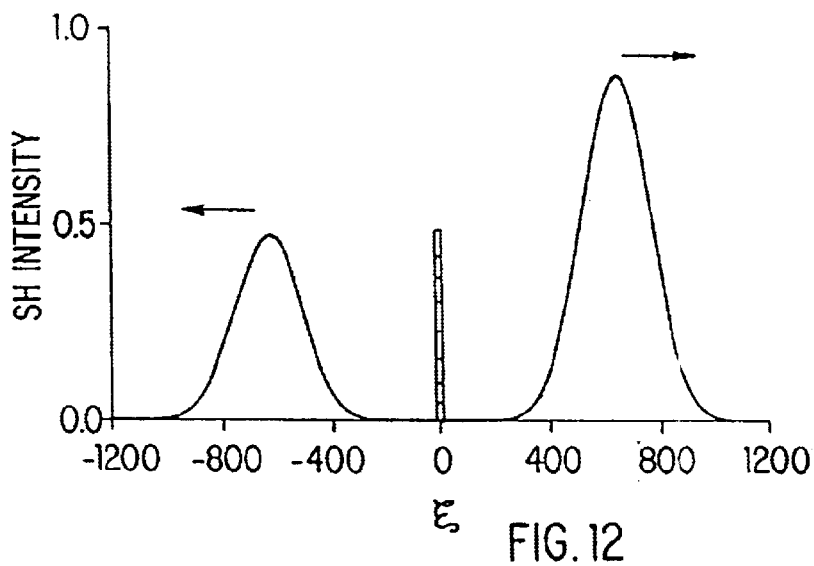
FIG. 12 shows spontaneously generated SH pulses.

Also, both the amplitude and the width of the generated SH pulses increase with increasing incident pulse width. FIG. 12 shows the SH field propagating away from the structure. While the pump was incident from the left, note that the structure radiates significantly in both directions, and that the SH pulses generated have the same width as incident pump pulses. It would be difficult to predict this overall behavior a priori, especially in the absence of analytical results in this regime. Further, tuning the pump away from the band edge, tuning to the high-frequency band edge, or modifying the nonlinear dipole distribution can significantly alter the pattern of FIG. 12.

Figure 13:
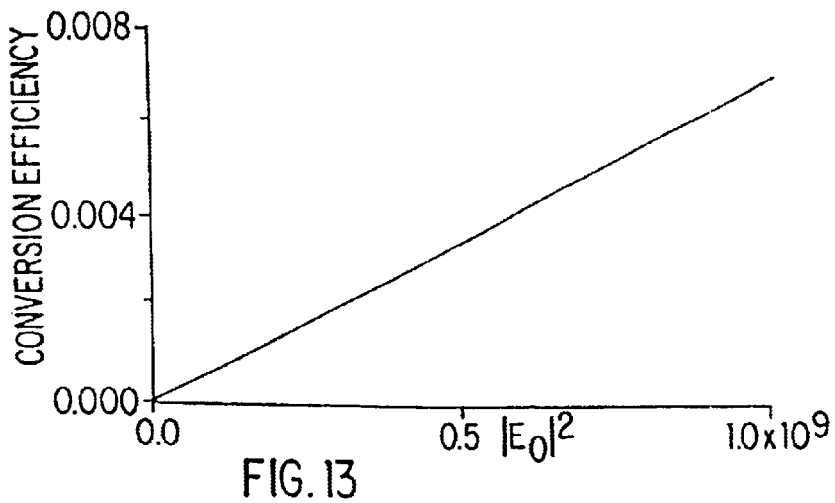
FIG. 13 shows SH conversion efficiency versus incident pulse peak field strength.

FIG. 13 is a plot of the conversion efficiency vs. peak field intensity in Gaussian units, for a pulse of 1 ps duration, where $|E|^2$ of $10^9$ in these units corresponds to roughly 10

GW/cm$^2$ in free space. The free-space value of the energy flow is to be distinguished from energy flow inside the structure. Here, efficiency is defined as the ratio between the final total SH energy and the total initial pump energy. This ratio is also representative of the ratio between the corresponding peak field intensities, respectively. FIG. 13 indicates that for this simple PBG structure only 12 μm in length, a conversion efficiency of order $10^{-2}$ can be achieved with pump intensity of 10 GW/cm$^2$, yielding a SH signal intensity of approximately 0.1 GW/cm$^2$. This is quite remarkable, considering that the PBG structure is only a few micrometers in length, only a single pump pass occurs, and that a very modest value of $\chi^{(2)}$=0.1 pm/V is used. Note that a $\chi^{(2)}$ value of 0.1 pm/V is a conservative value. Clearly, materials chosen with even higher $\chi^{(2)}$ values can be incorporated into the PBG structure of the present invention, resulting in conversion efficiencies approaching $10^{-1}$. Considering the extremely compact nature of the PBG device of the present invention, and that the pump traverses the sample only once, the gain-to-device length ratio undergoes several orders of magnitude improvement over current state of the art devices.

Such large enhancements with respect to phase-matched up-conversion can be explained as follows. According to Fermi's golden rule, the power radiating from an oscillating dipole is given by $P(\omega)=\rho(\omega)|E(\omega)|^2$, where $\rho(\omega)$ is the density of modes and $|E(\omega)|^2$ is the eigenmode intensity. The average energy output can be obtained by multiplying the power output by τ, the interaction time. As pointed out above, all these quantities increase by nearly one order of magnitude for the PBG structure. In fact, since $|E(\omega)|^2$ and τ are both proportional to $\rho(\omega)$, then the total energy emitted is generally proportional to $\rho(\omega)^3$. Hence the significant increase in the total energy output that is shown in FIG. 11.

Higher conversion efficiencies can readily be achieved by increasing pump power, or, as mentioned earlier, by increasing the length of the structure by only modest amounts. For example, calculations show that by increasing the total number of periods to 30, thus increasing the length of the device by 50%, the SH output energy (and power level) increases by a factor of 5 for a 1 ps pulse, enhancing the conversion efficiency by the same factor. This occurs because the maximum group index increases approximately as N$^2$, where N is the number of periods. The field eigenmode intensity is also proportional to N$^2$, thus enhancing energy output in a nonlinear fashion with respect to device length.

Calculations also indicate that in the linear, undepleted-pump regime, the conversion efficiency is proportional to the free-space peak field value, as illustrated in FIG. 13. Here, any small deviation in the actual $\chi^{(2)}$ value, tuning with respect to the band edge, and input pulse width can significantly affect comparison with experimental results. For this reason, the model presented above is of great value in order to determine the overall behavior of a PBG structure, and it can be used in the determination of $\chi^{(2)}$. Therefore, exercising reasonable care in the design process of a PBG device based on the present invention can produce a very efficient SH generator, provided absorption at the SH wavelength is minimized. Note that a similar model can also be used to design an efficient third harmonic generator, and the like.

In another embodiment of the present invention, a structure comprises a series of alternating layers, where $n_1(\Omega, 2\Omega)=1$ and $n_2(\Omega,2\Omega)=1.42857$. For added simplicity, it is assumed that the material is not dispersive. For this example, layer thicknesses are chosen such that the width of the low index layer is $a=0.65\lambda_0/n_1$ (the low index layer is now the active layer because of the shift in localization of the field), and the width of the high index layer is such that $b=0.089\lambda_0/n_2$. Then, tuning the pump at the first resonance of the first-order, high-frequency band edge causes the SH signal to be tuned at the second resonance of the second-order high-frequency band edge, in analogy to what was accomplished above for the low-frequency band edge. However, the conversion efficiency for the high frequency band edge example can increase up to about a factor of two for a 1 ps pulse, compared to the low-frequency band-edge conversion efficiency. Tuning the pump at the high-frequency band edge causes a shift of the pump field localization in the low index layer. This shift increases the field eigenmode intensity in that layer. Also, the width of the active layer increases by about 30%, from $0.5\lambda_0$ to $0.65\lambda_0$. This combination can account for the increase in overall nonlinear gain for a device length of approximately 12 μm in length.

c. GaAs/AlAs and AlN/SiO$_2$ Half-quarter-wave Stack for SH Generation

This section describes a numerical model of a mixed half-quarter-wave structure comprising 20 periods of GaAs/AlAs material. It was assumed that $\chi^{(2)} \approx 1$ pm/V for both materials, the index of refraction alternated between $n_1(\Omega)$= 2.868 and $n_2(\Omega)$=3.31, $n_1(2\Omega)$=2.9 and $n_2(2\Omega)$=3.35, and that abso could be ignored. These indices correspond to a pump wavelength of 3 μm, and a second-harmonic signal at 1.5 μm. For a pump intensity of 10 GW/cm$^2$, the mixed half-quarter-wave GaAs/AlAs structure produced conversion efficiencies on the order $10^{-2}$–$10^{-3}$ for this 20-period structure. The model equations described above for nonlinear SH gain (which from Eq. (6) is defined as the product $\chi^{(2)}{}_-^2\Omega$) indicate that this high conversion efficiency is due to the order-of-magnitude increase in $\chi^{(2)}$ and the order-of-magnitude decrease in the field eigenmode intensity (due to the substantial increase in the index for GaAs). In addition, a significant increase in conversion efficiency can be achieved with increasing number of periods in the PBG structure. These results also indicate that different materials, such as II–VI based semiconductors, would be ideal for up-converting at higher frequencies.

As another example, we consider 30-periods of alternating SiO$_2$/AlN layers, to form a quarter-wave/half-wave stack similar to that described in the previous section. With a reference wavelength of 0.52 microns, the total length of the structure is approximately 6 microns. The AlN layers are assumed to have a nonlinear coefficient of about 10 pm/V. The FF beam is assumed to be incident at an angle of 30° degrees with respect to the surface of the structure. The FF frequency, at 800 nm, is tuned to the first transmission resonance near the first order band gap, where the corresponding linear mode is well localized, and a high density of modes is achieved. The SH frequency is tuned to 400 nm, which corresponds to the second resonance peak near the second order gap. We note that we are using experimentally available data for both materials, and that aligning the resonances as prescribed can be done by varying the thickness of the layers, i.e., by adjusting the geometrical dispersion of the structure. The structure is exactly phase-matched $\Delta k_{eff}$=0 in the sense of the effective index of Centini et al, and the predictions are for increased conversion efficiency.

6. Method of Frequency Conversion—Harmonic Generation

Figure 14:
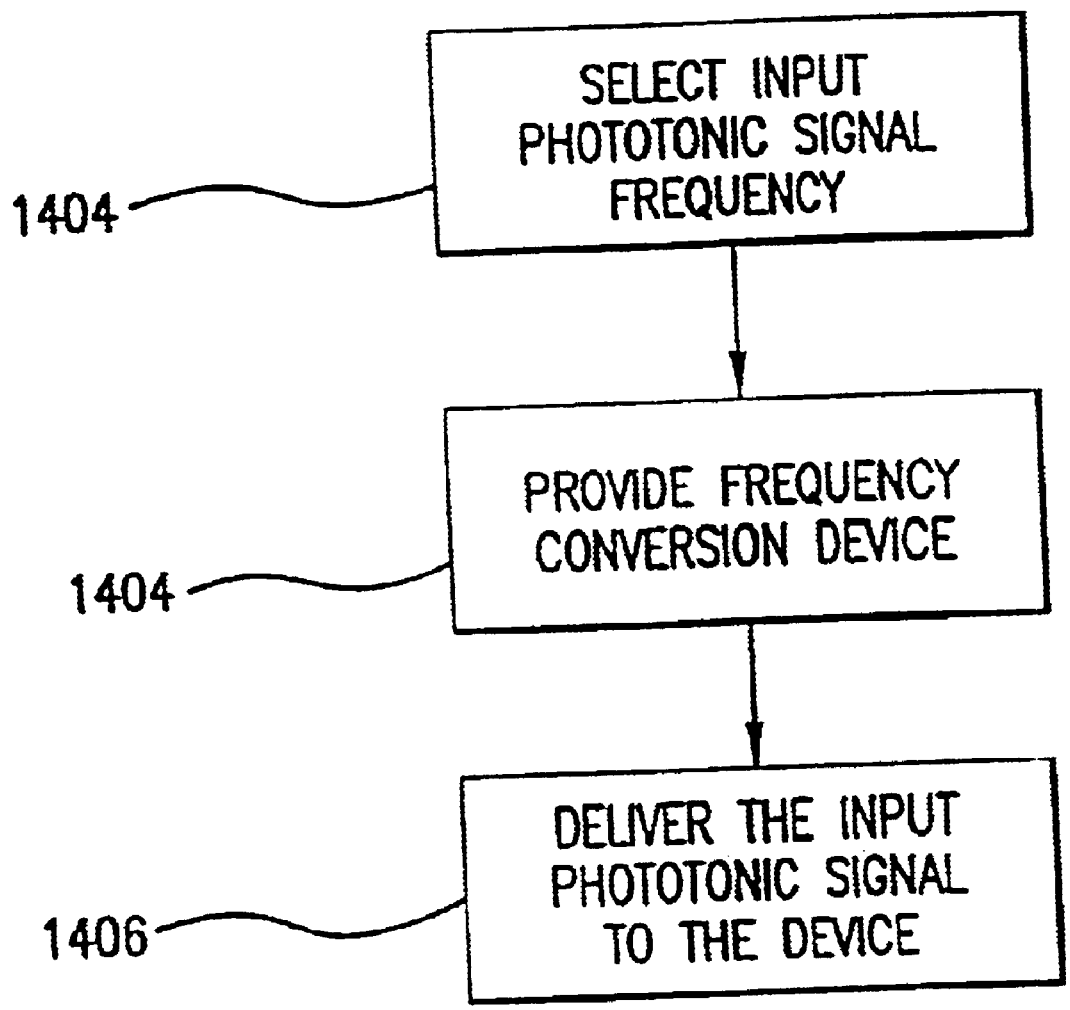
FIG. 14 is a flowchart illustrating a method of generating frequency conversion according to the present invention.

A method for performing frequency conversion of an input photonic signal is shown in FIG. 14. The input photonic signal has an input photonic signal frequency and an input photonic signal bandwidth. In step 1402, the frequency of the input photonic signal is selected so as to correspond to a second signal at a desired harmonic frequency. In addition, the type of input signal (e.g., continuous wave or pulsed operation) should also be considered. Next a device is provided in step 1404, where the device comprises an arrangement of material layers that exhibits a photonic bandgap structure. Various types of material layer arrangements are discussed above. The specific type of arrangement (and hence the type of frequency conversion to be performed) depends upon factors that include, but are not limited to: (1) the absorption and transmission properties of the materials selected; (2) the indices of refraction of the materials forming the structure, which affects such parameters as the index discontinuity; (3) the thicknesses of the material layers; and (4) the number of periods of alternating layers. The combination of parameters results in a PBG structure that preferably exhibits a transmission band edge corresponding to the input photonic signal frequency. Finally, the input photonic signal is delivered into the device in order to generate a second photonic signal at an harmonic frequency of the pump signal. An interaction of the input photonic signal with the arrangement of layers generates the second photonic signal at a second frequency, where the second frequency is different than the first frequency. It will be apparent to one of skill in the art to use this method to perform such frequency conversion techniques as, for example, harmonic generation and optical parametric oscillation.

7. Frequency Down-conversion

Figure 15:
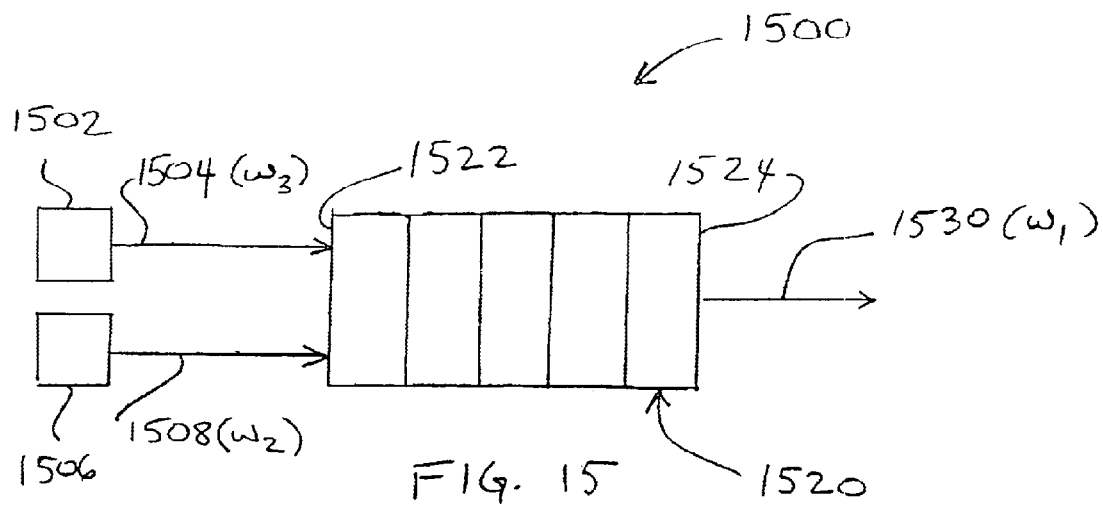
FIG. 15 is a block diagram of an embodiment of a system for frequency down-converting photonic signals.

Another aspect of the present invention is directed to photonic signal frequency down-conversion using a PBG structure similar to the above described structures, as is now described. FIG. 15 is a block diagram of an embodiment of a system 1500 for frequency down-converting photonic signals. System 1500 includes a first pump light source 1502, such as a laser, for generating a first coherent photonic beam or signal 1504 at a first frequency $\omega_3$. A second pump light source 1506, such as a laser, generates a second coherent photonic beam or signal 1508 at a second frequency $\omega_2$. In one embodiment, each of pump light sources 1502 and 1504 generates pulsed laser light. In another embodiment, each of pump light sources 1502 and 1504 generates Continuous Wave laser light. In still another embodiment, pump light source 1502 generates pulsed laser light while pump light source 1504 generates Continuous Wave laser light.

System 1500 includes a PBG device 1520 constructed and arranged in accordance with the present invention to frequency down-convert photonic signals incident on the device. PBG device 1520 includes an input face 1522 for receiving incident photonic signals 1504 and 1508, and an output face 1524. PBG device frequency down-converts photonic signals 1504 and 1508 to generate a coherent, frequency down-converted output photonic signal 1530 having a frequency $\omega_1=\omega_3-\omega_2$, which is partially transmitted and exits output face 1524, and is partially reflected and exits from face 1522.

Down-converted output photonic signal 1530 results from a photonic frequency mixing process, within the PBG structure of PBG device 1520, between first and second photonic signals 1504 and 1508 incident on the PBG structure. Assuming the first and second photonic signals 1504 and 1508 have respective center frequencies $\omega_3$ and $\omega_2$, the frequency mixing process within PBG device 1520 generates the following coherent, frequency conversion products (also referred to as mixing products): the third photonic signal (e.g., photonic signal 1530) at difference frequency $\omega_1=\omega_3-\omega_2$; and a fourth photonic signal at a sum frequency $\omega_4=\omega_3+\omega_2$. The third photonic signal at down-converted difference frequency $\omega_1$, represented by output photonic signal 1530, is of interest in the down-conversion process, while the sum of the frequencies is of interest in the up-conversion process, which we will discuss later.

Figure 16:
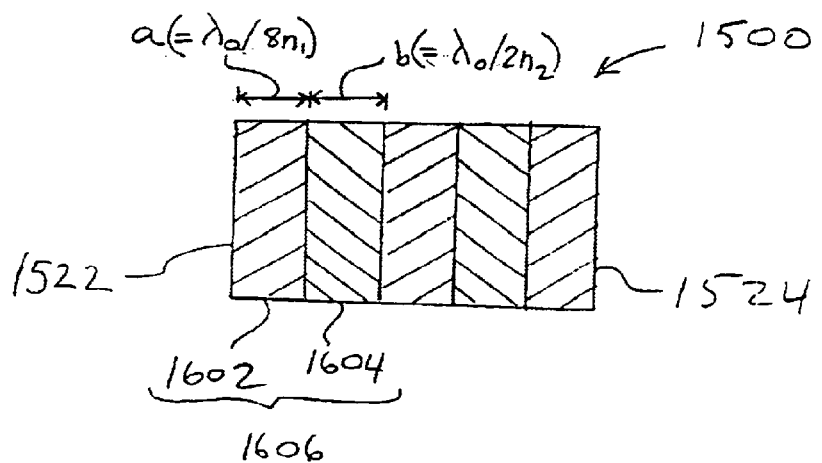
FIG. 16 is an embodiment of a PBG device from FIG. 15 capable of frequency down-converting photonic signals incident on the PBG device.

FIG. 16 is an embodiment of PBG device 1500 capable of frequency down-converting photonic signals incident on the device, in the exemplary manner described above. PBG device 1500 includes a first material layer 1602 and a second material layer 1604 together forming a single period 1606. For a reference wavelength $\lambda_0$, layers 1602 and 1604 have respective refractive indices $n_1$ and $n_2$, and respective thicknesses $a=\lambda_0/(8n_1)$ and $b=\lambda_0/(2n_2)$, to form respective eighth-wave and half-wave layers in single period 1606. Single period 1606 is repeated to form a mixed half-eighth wave multilayer stack for wavelength $\lambda_0$. Therefore, PBG device 1500 is also referred to as a mixed half-eighth wave multilayer stack 1500.

Figure 17A:
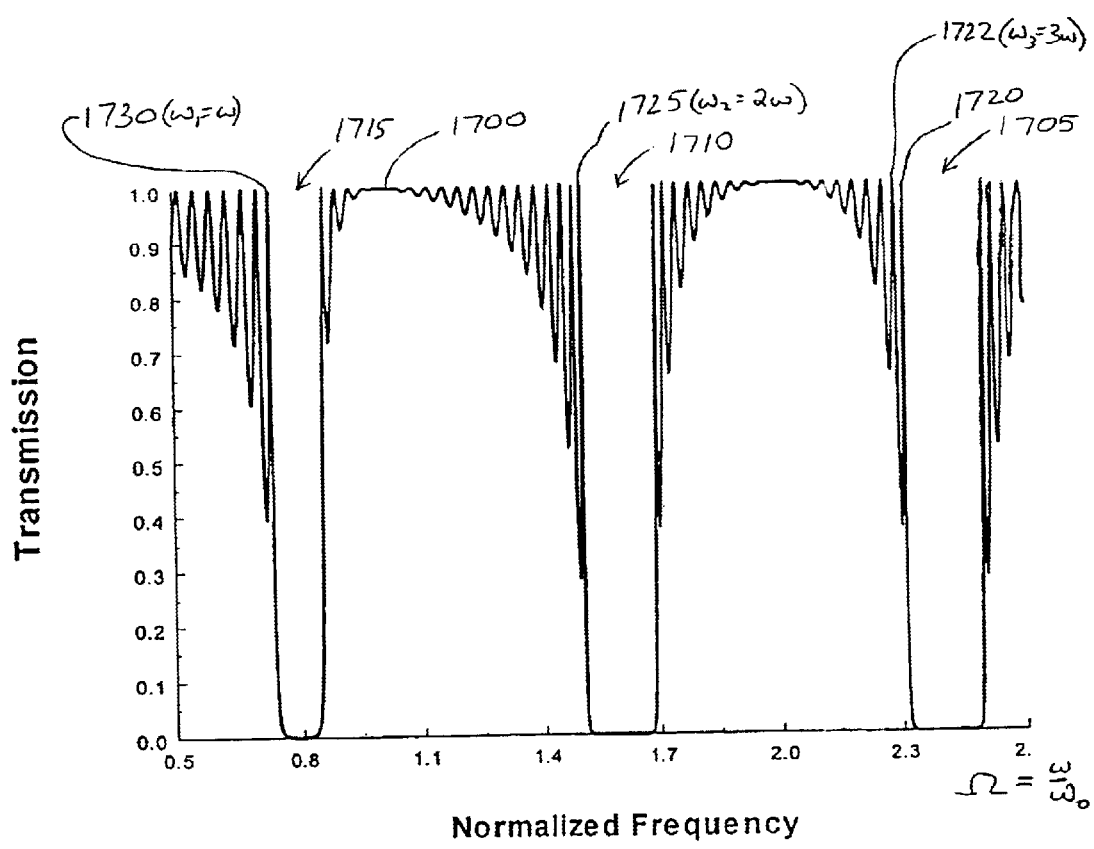
FIG. 17A is a transmission function of the PBG device of FIGS. 15 and 16. Tuning a plurality of fields ($\omega_1$, $\omega_2$, and $\omega_3$) as depicted in FIG. 17A meets phase matching conditions conducive to photonic signal down-conversion in the present invention.

FIG. 17A is a transmission function 1700 of the example half-eighth wave multilayer stack of FIGS. 15 and 16. Transmission function 1700 is a plot of the transmission coefficient of PBG device 1500 versus the normalized or scaled frequency $\Omega=\omega/\omega_0$, where $\omega_0=2\pi c/\lambda_0$. The arrangement of layers in device 1500 causes transmission function 1700 to exhibit the following three harmonically related bandgaps: a high order or high frequency bandgap 1705; an intermediate frequency bandgap 1710; and a low order or low frequency bandgap 1715.

High frequency bandgap 1705 includes a low order bandgap edge 1720, and a transmission resonance 1722 corresponding to a photonic frequency $\omega_3=3\omega$. Intermediate bandgap 1710 includes a low order band edge 1725 corresponding to a photonic frequency $\omega_2=2\omega$. Low order bandgap 1715 includes a low order band edge 1730 corresponding to a photonic frequency of $\omega_1=\omega$. With reference again to FIG. 15, when input photonic signals 1504 and 1508 have respective frequencies $\omega_3=3\omega$ and $\omega_2=2\omega$, that is, frequencies tuned at or near transmission resonances 1722 and 1725, PBG device 1500 generates down-converted output photonic signal 1530 at difference frequency: $\omega_1=\omega_3-\omega_2$, where frequency $\omega_1$ is tuned to low order band edge 1730.

Figure 17B:
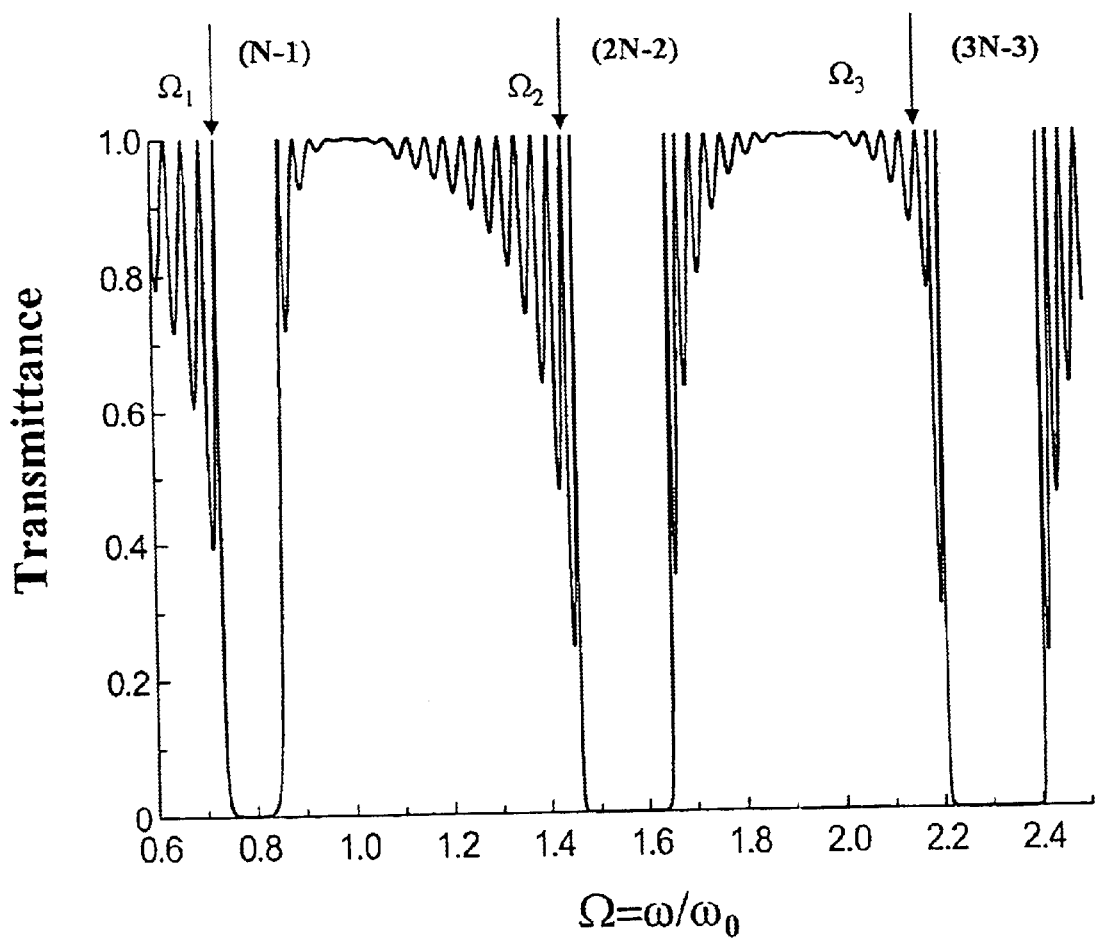
FIG. 17B is a transmission function of the PBG device of FIGS. 15 and 16. Tuning the plurality of fields ($\omega_1$, $\omega_2$, and $\omega_3$) as depicted in FIG. 17B, as an alternative to the tuning of the fields in 17B, also meets phase matching conditions conducive to photonic signal down-conversion in the present invention.

Tuning the $\omega_1$, $\omega_2$, and $\omega_3$ fields as depicted in FIG. 17A meets phase matching conditions conducive to photonic signal down-conversion in the present invention. However, these tuning conditions are not unique in that one may tune the fields in a slightly different way to satisfy the phase matching conditions similar to those outlined above in Eqs.(14–16). The precise nature of the phase matching conditions when more than two fields are present are outlined in the manuscript entitled "Efficient nonlinear infrared generation in one dimensional photonic band gap materials" by M. Centini et al, submitted for publication to Optics Communications. With reference to FIG. 17B, the phase matching conditions can also be satisfied by arranging the fields in a slightly different way. Generally, this kind of flexibility cannot be exploited in ordinary nonlinear frequency conversion materials, and is one of the more attractive features of our invention.

The criteria resulting in a structure suitable for frequency down-conversion in PBG device 1500 are now further described with reference to an example three-wave (that is, three-photonic signal) frequency mixing process. The example three-wave mixing process includes:

a first pumping field (for example, photonic signal 1504) tuned to frequency $\omega_3=3\omega$, corresponding to a wavelength ($\lambda_3$) of 1 micron; and a second pumping field (for example, photonic signal 1508) tuned to frequency $\omega_2=2\omega$, corresponding to a wavelength ($\lambda_2$) of 1.5 microns.

These first and second pumping fields interact such that their respective frequencies $\omega_3$ ($\lambda_3$=1 micron) and $\omega_2$ ($\lambda_2$=1.5 micron) mix to generate sum and difference frequencies, as described above. For frequency down-conversion, conditions are established such that a field (that is, a photonic signal) is generated at the difference frequency $\omega_1=\omega_3-\omega_2$, having a corresponding wavelength of 3 microns. The choice of pumping fields at wavelengths of 1 and 1.5 microns is convenient for illustrative purposes (but is not necessary) because frequency mixing between the 1 and 1.5 micron fields results in a down-converted field having a wavelength ($\lambda_1$) of 3 microns.

The particular structure of PBG 1500, namely, the mixed half-eighth wave multilayer stack significantly enhances an interaction between the three waves (i.e., fields) at frequencies $\omega_3=3\omega(\lambda_3=1$ micron), $\omega_2=2\omega(\lambda_2=1.5$ micron) and $\omega_1=\omega(\lambda_1=3$ micron). With reference again to FIG. 17A, the three fields $\omega_1$, $\omega_2$, and $\omega_3$ are depicted as being tuned to respect band edge features 1722, 1725, and 1730. With the three fields tuned as depicted in FIG. 17A, a high density of modes is achieved. The fields $\omega_1$, $\omega_2$, and $\omega_3$ have corresponding frequencies $\omega_1=\omega$, $\omega_2=2\omega$, and $\omega_3=\omega_2+\omega_1$ (in this case, $\omega_3=3\omega$) with $k_1 \equiv k=\omega/c$, $k_2=2\omega/c$, and $k_3=3\omega/c$. Following the formalism of Eqs.(14–16) above, tuning the fields as in FIG. 17A leads to the following conditions on the wave vectors:

$$\beta_1 = \frac{\pi}{N}(N-1) \tag{17}$$

Then, we tune the field $\omega_2$ at the first resonance near the second order band edge, once again securing a high density of modes; we have:

$$\beta_2 = \frac{\pi}{N}(2N-1) \tag{18}$$

We now impose the phase-matching condition for the three-wave mixing process, namely:

$$K_3(\omega_3)-K_2(\omega_2)-K_1(\omega_1)=0 \tag{19}$$

Substituting as before, we have the condition on the third wave, namely:

$$\beta_3 = \frac{\pi}{N}(3N-2) \tag{20}$$

which is the value of the Bloch's phase that will correspond to the field at frequency $\omega_3$. This means that phase-matching conditions will be satisfied for this structure if the thickness of the layers are combined with material dispersion such that the first pump field is tuned to the second resonance away from the low frequency band edge of the third order gap (3N−2).

In order to illustrate the flexibility of the structure, the phase matching condition for the three-wave mixing process can also be obtained as outlined on FIG. 17B. In that case, the wave vectors in Eqs.(17), (18) and (20) have the following factors, respectively: (N−1), (2N−2), and (3N−3), conditions which yield nearly identical results as the conditions of FIG. 17A.

Figure 18:
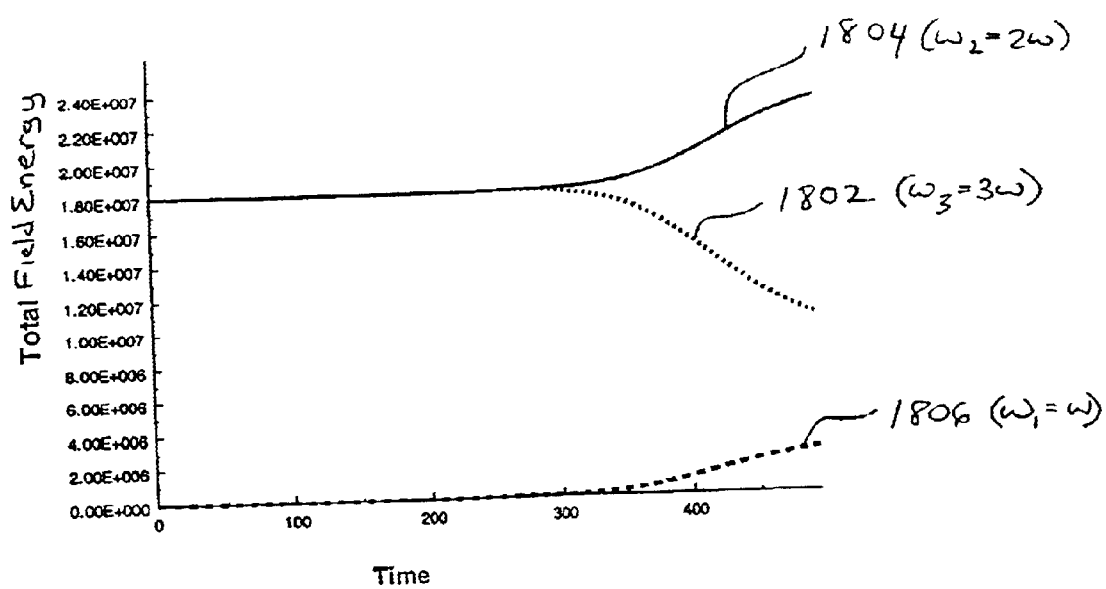
FIG. 18 includes a series of energy function plots of first and second photonic pump fields and a down-converted photonic field resulting from pumping the PBG device of FIG. 15 with the first and second photonic pump fields. Each energy function plot is a plot of total integrated energy vs. time the associated photonic field.

FIG. 18 includes a plot of an example energy function 1802 for the $\omega_3$ pump field, a plot of an example energy function 1804 for the $\omega_2$ pump field, and a plot of an example energy function 1806 for the down-converted field $\omega_1$, when PBG device 1500 is pumped with short photonic pulses (having approximately 0.5 picosecond durations, for example) of the $\omega_3$ and $\omega_2$ pump fields. Each of the energy functions is a plot of total integrated energy vs. time for each associated field, as the $\omega_3$ and $\omega_2$ field pump pulses sweep through PBG device 1500. A steady state is reached as soon as the pump pulses leave the PBG structure.

With reference to FIG. 18, the down-converted field $\omega_1$ and pump field $\omega_2$ experience effective gain during the mixing interaction of the three waves. However, the $\omega_3$ pump field is nearly 50% depleted. For this specific example, the layered PBG structure 1500 yields:

(1) conversion efficiencies approximately 500 times better compared to the efficiency of bulk;
(2) a depletion of nearly 50% of the 1-micron pump;
(3) a conversion rate of 20% for the 3-micron field; and
(4) a gain of 30% for the 1.5-micron signal.

Considering that incident pump fields are of order $10^7$ V/m (100 MW/cm$^2$ flux), and that $\chi^{(2)}$ is a modest 100 pm/V, the above described effects reveal a remarkable photonic frequency down-conversion capability. Furthermore, SH generation in bulk materials is generally proportional to $L^2$, where L is the length of the PBG device 1500. In the case of PBG structures, phase matching and band edge effects yield a SH intensity proportional to $L^6$. A length L=NΛ, where N is the number of periods and Λ is the thickness of the unit cell (period), conversion efficiencies can be improved even more dramatically by adding only a few periods.

The formalisms and examples described above for the down-conversion process also apply to the frequency up-conversion process. For example, the above described model can be inverted as follows: instead of injecting an $\omega_3$ and $\omega_2$ field, we simply inject an $\omega_1$ field, which has a lower frequency. Then using the conditions outlined in FIG. 17B, the unusual, unprecedented set of circumstances arise: there two competing processes that take place. First, second harmonic generation occurs, and our structure provides exact phase matching for that process. Second, the resulting fields mix to generate the third frequency, or $\omega_3$, which in this case corresponds to third harmonic generation. Remarkably, this process is also phase matched. Therefore, we have two competing processes that are simultaneously phase matched, which means that depending on the precise nature of the coupling coefficients, i.e., number of layers, tuning, layer thickness, etc., we may selectively enhance either second or third harmonic generation, once again highlighting the great flexibility afforded by photonic band gap structures. We note that under ordinary conditions, phase matching a three-wave mixing process in the manner described above and as illustrated in our FIG. 17B is difficult to achieve in ordinary materials.

Current technology allows the construction of microscale, layered structures. It is expected that such construction techniques as applied to the above described PBG photonic frequency down-converting structures will have significant impact in dual use applications. The 3–5 micron wavelength range is important for remote sensing, laser ranging, blinding of enemy seekers, and detection of biological and chemical components. PBG down-conversion devices as described above can reduce the volume of an active portion of a portable sensing unit by up to seven orders of magnitude (to produce, for example, a wafer having 10 cm sides, and a length of 10–40 microns), thus making space-based applications possible. Current terrestrial wind measurement projects carried out by NASA investigators, for example, use high power IR sources whose size prevents their effective use in satellite platforms. The present invention advantageously overcomes such a size limitation.

8. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all articles and patent documents mentioned above are incorporated by reference herein.

What is claimed is:

1. A device for frequency down-converting a photonic signal incident upon the device, comprising:
   a plurality of first material layers; and
   a plurality of second material layers,
      the first and second material layers being adapted to receive first and second photonic signals incident upon the device and having respective first and second frequencies, the first and second material layers being arranged such that the device exhibits a photonic band gap structure, wherein the photonic band gap structure exhibits first and second transmission band edges respectively corresponding to the first and second frequencies, and wherein an interaction of the first and second photonic signals with the arrangement of layers causes a mixing process to generate a third photonic signal having a third frequency that is less than the first and second frequencies.

2. The device of claim 1, wherein said first and second material layers are arranged in a periodically alternating manner such that the arrangement formed therefrom exhibits said photonic band gap structure.

3. The device of claim 1, wherein said first material layer has a first index of refraction and said second material layer has a second index of refraction, said first index of refraction and said second index of refraction being different.

4. The device of claim 1, wherein said first material layer has a first thickness and said second material layer has a second thickness, said first thickness and said second thickness being different.

5. The device of claim 1, wherein said photonic band gap structure also exhibits a set of transmission resonances near the third order band gap, and wherein said third frequency is tuned such that phase matching conditions are satisfied to enhance the generation of the third frequency.

6. The device of claim 1, wherein each of said first and second input photonic signals is one of 1) a continuous wave photonic signal generated by a continuous wave laser source, and 2) a pulsed photonic signal generated by a pulsed laser source.

7. The device of claim 1, wherein said arrangement of layers forms a mixed half-eighth wave structure.

8. The device according to claim 1, wherein said first and second material layers respectively comprise GaAs and AlAs semiconductor layers, said first and second layers being formed on an appropriate substrate.

9. The device according to claim 1, wherein said first and second material layers respectively comprise AlN and $SiO_2$ layers, said first and second layers being formed on a appropriate substrate.

10. The device of claim 1, wherein a length of the device is between 300 hundred nanometers and 300 thousand microns.

11. A method of frequency down-converting a photonic signal incident on a device, the device including a plurality of first material layers and a plurality of second material layers, the first and second material layers being arranged such that the device exhibits a photonic band gap structure, wherein the photonic band gap structure exhibits first and second transmission band edges, the method comprising the steps of:
   applying first and second photonic signals to the first and second material layers, the first and second photonic signals having respective first and second frequencies corresponding to the first and second transmission band edges, wherein an interaction of the first and second photonic signals with the arrangement of layers causes a mixing process to generate a third photonic signal having a third frequency that is less than the first and second frequencies.

12. The method of claim 11, further comprising the step of mixing the first and second frequencies such that the third frequency is the difference between the first and second frequencies.

13. The method of claim 12, wherein the mixing step generates the third frequency such that the third frequency is tuned to a third transmission resonance associated with a third band gap edge.

14. The method of claim 11, wherein a number of input beams may be injected to a plurality of first and second layers, such that phase matching conditions are satisfied.

15. A device for frequency up-converting a photonic signal incident upon the device, comprising:
   a plurality of first material layers; and
   a plurality of second material layers,
      the first and second material layers being adapted to receive a first photonic signal incident upon the device and having a first frequency, the first and second material layers being arranged such that the device exhibits a photonic band gap structure, wherein the photonic band gap structure exhibits first and second transmission band edges respectively corresponding to a first and a second frequency, and wherein an interaction of the first photonic signal may generate a second photonic signal with a frequency near the second band edge, and such that the arrangement of layers causes a further mixing process to generate a third photonic signal having a third frequency that is more than the first and second frequencies.

16. The device of claim 15, wherein said first and second material layers are arranged in a periodically alternating manner such that the arrangement formed therefrom exhibits said photonic band gap structure.

17. The device of claim 15, wherein said first material layer has a first index of refraction and said second material layer has a second index of refraction, said first index of refraction and said second index of refraction being different from one another.

18. The device of claim 15, wherein said first material layer has a first thickness and said second material layer has a second thickness, said first thickness and said second thickness being different from one another.

19. The device of claim 15, wherein said photonic band gap structure also exhibits a third transmission resonance at a third order band gap, and wherein said third frequency is tuned to said third transmission resonance.

20. The device of claim 15, wherein the input photonic signal is one of 1) a continuous wave photonic signal generated by a continuous wave laser source, and 2) a pulsed photonic signal generated by a pulsed laser source.

21. The device of claim 15, wherein said arrangement of layers forms a mixed half-eighth wave multilayer stack, and said second frequency is a second harmonic of the input photonic signal frequency, and said third photonic signal is a third harmonic of the input photonic signal frequency.

22. A method of frequency up-converting a photonic signal incident on a device, the device including a plurality of first material layers and a plurality of second material layers, the first and second material layers being arranged such that the device exhibits a photonic band gap structure, wherein the photonic band gap structure exhibits first and second transmission band edges, the method comprising the steps of:

applying a first photonic signal to the first and second material layers, generating a second photonic signal having a second frequency corresponding to the second transmission band edge, wherein a subsequent interaction of the first and second photonic signal with the arrangement of layers causes a mixing process to generate a third photonic signal having a third frequency that is more than the first and second frequencies.

23. The method of claim 22, wherein a first and second photonic signal are injected inside the plurality of layers.

24. The method of claim 22, further comprising the step of mixing the first and second frequencies such that the third frequency is the sum of the first and second frequencies.

25. The method of claim 24, wherein the mixing step generates the third frequency such that the third frequency is tuned to a third transmission resonance associated with a third band gap edge.

26. The method of claim 22, wherein a number of input beams may be injected to a plurality of first and second layers, such that phase matching conditions are satisfied.

* * * * *